(12) United States Patent
Gopalakrishnan et al.

(10) Patent No.: US 12,432,593 B2
(45) Date of Patent: Sep. 30, 2025

(54) METHODS AND SYSTEMS FOR CLOUD BASED WIRELESS CHANNEL SCANNING

(71) Applicant: Nile Global, Inc., San Jose, CA (US)

(72) Inventors: Guru Gopalakrishnan, San Jose, CA (US); Vijay Kumar Pamidipati, Bengaluru (IN); Sathish Damodaran, San Jose, CA (US); Vikas Patel, Bengaluru (IN); Jeffin Mammen, Bangalore (IN)

(73) Assignee: Nile Global, Inc., San Jose, CA (US)

( * ) Notice: Subject to any disclaimer, the term of this patent is extended or adjusted under 35 U.S.C. 154(b) by 386 days.

(21) Appl. No.: 17/824,746

(22) Filed: May 25, 2022

(65) Prior Publication Data

US 2023/0362797 A1 Nov. 9, 2023

Related U.S. Application Data

(60) Provisional application No. 63/338,851, filed on May 5, 2022.

(51) Int. Cl.
*H04W 24/10* (2009.01)
*H04B 17/345* (2015.01)
*H04W 8/00* (2009.01)
*H04W 48/16* (2009.01)
(Continued)

(52) U.S. Cl.
CPC .......... *H04W 24/10* (2013.01); *H04B 17/345* (2015.01); *H04W 8/005* (2013.01); *H04W 48/16* (2013.01); *H04W 48/20* (2013.01); *H04W 84/12* (2013.01)

(58) Field of Classification Search
CPC ..... H04W 8/005; H04W 84/12; H04W 24/02; H04W 24/08; H04W 24/10; H04W 36/0061; H04W 48/16; H04W 48/20; H04W 72/541; H04B 17/345; H04B 17/318; H04L 41/08; H04L 41/0803; H04L 41/16
See application file for complete search history.

(56) References Cited

U.S. PATENT DOCUMENTS

| 7,336,670 B1* | 2/2008 | Calhoun ................ H04L 63/14 370/252 |
| 8,116,275 B2 | 2/2012 | Matta et al. |
| 8,630,220 B2 | 1/2014 | Umeuchi et al. |

(Continued)

FOREIGN PATENT DOCUMENTS

WO 2015175345 A1 11/2015

OTHER PUBLICATIONS

Notice of Allowance for U.S. Appl. No. 17/824,741, dated Mar. 3, 2025, 17 pages.

*Primary Examiner* — Quoc Thai N Vu
(74) *Attorney, Agent, or Firm* — LOZA & LOZA, LLP

(57) ABSTRACT

Embodiments of a device and method are disclosed. In an embodiment, a method for wireless channel scanning involves at a cloud server, building a set of channels for off-channel scanning to be performed by a selected group of wireless access points (APs), at the cloud server, determining whether the set of channels for off-channel scanning can be further pruned to generate a final optimized list of channels for off-channel scanning, and at the cloud server, sending the final optimized list of channels for off-channel scanning to the selected group of wireless APs.

12 Claims, 15 Drawing Sheets

(51) Int. Cl.
*H04W 48/20* (2009.01)
*H04W 84/12* (2009.01)

(56) References Cited

U.S. PATENT DOCUMENTS

| | | |
|---|---|---|
| 2004/0001532 A1 | 1/2004 | Mason, Jr. et al. |
| 2017/0265205 A1 | 9/2017 | Homchaudhuri et al. |
| 2018/0035365 A1 | 2/2018 | Koratekere Honnappa et al. |
| 2018/0212827 A1* | 7/2018 | Eryigit .................. H04W 24/02 |
| 2020/0413491 A1* | 12/2020 | Ansley .................. H04W 92/02 |
| 2021/0184930 A1 | 6/2021 | Mutnuru et al. |

* cited by examiner

METHODS AND SYSTEMS FOR CLOUD BASED WIRELESS CHANNEL SCANNING

BACKGROUND

Growing adoption of networks, such as, enterprise campus networks allows enterprises to increase network coverage and functionality. For example, due to the dynamic nature of the business and campuses, switches, gateways, wireless access points (APs), and client devices, such as, laptops, printers, servers, security cameras, and/or other connected Internet of things (IoT) devices are typically interconnected in a network. Wireless network management, for example, wireless channel scanning, plays an important role in ensuring that network design, deployments and/or operations meet agreed upon commitments. For example, wireless channel scanning can be performed periodically for a Wireless Intrusion Prevention System (WIPS), a Wireless Intrusion Detection System (WIDS), channel planning applications, and/or client location related applications. However, wireless channel scanning can be difficult to implement due to varying wireless channel conditions and/or interference. Therefore, there is a need for network technology that can provide efficient wireless channel scanning for a network with wireless capabilities.

SUMMARY

Embodiments of a device and method are disclosed. In an embodiment, a method for wireless channel scanning involves at a cloud server, building a set of channels for off-channel scanning to be performed by a selected group of wireless access points (APs), at the cloud server, determining whether the set of channels for off-channel scanning can be further pruned to generate a final optimized list of channels for off-channel scanning, and at the cloud server, sending the final optimized list of channels for off-channel scanning to the selected group of wireless APs. Other embodiments are also described.

In an embodiment, at the cloud server, determining whether the set of channels for off-channel scanning can be further pruned to generate the final optimized list of channels for off-channel scanning includes at the cloud server, determining whether the set of channels for off-channel scanning can be further pruned based on preferred scanning channel (PSC) information.

In an embodiment, at the cloud server, determining whether the set of channels for off-channel scanning can be further pruned to generate the final optimized list of channels for off-channel scanning includes at the cloud server, determining whether the set of channels for off-channel scanning can be further pruned based on historical channel utilization of the selected group of wireless APs.

In an embodiment, at the cloud server, determining whether the set of channels for off-channel scanning can be further pruned to generate the final optimized list of channels for off-channel scanning includes at the cloud server, determining whether the set of channels for off-channel scanning can be further pruned based on active basic service set (BSS) data gathered by the selected group of wireless APs.

In an embodiment, the method further includes at the cloud server, causing spectral scans to be performed on the final optimized list of channels for off-channel scanning to detect non-WiFi interference.

In an embodiment, the method further includes at the cloud server, causing deauthentication frames to be constructed and transmitted by the selected group of wireless APs on the final optimized list of channels for off-channel scanning.

In an embodiment, the method further includes at the cloud server, causing medium access control (MAC) hardware (HW) of the selected group of wireless APs to be placed in promiscuous mode to capture different types of frames.

In an embodiment, the channels for off-channel scanning are of three different frequency ranges.

In an embodiment, the three different frequency ranges include 2.4 gigahertz (GHz), 5 GHz, and 6 GHz.

In an embodiment, each wireless AP of the selected group of wireless APs further includes three wireless radio frequency (RF) frontends having three different frequency ranges.

In an embodiment, the three wireless RF frontends are of 2.4 gigahertz (GHz), 5 GHz, and 6 GHz.

In an embodiment, a cloud server includes memory and one or more processors configured to build a set of channels for off-channel scanning to be performed by a selected group of wireless access points (APs), determine whether the set of channels for off-channel scanning can be further pruned to generate a final optimized list of channels for off-channel scanning, and send the final optimized list of channels for off-channel scanning to the selected group of wireless APs.

In an embodiment, the one or more processors are configured to determine whether the set of channels for off-channel scanning can be further pruned based on preferred scanning channel (PSC) information.

In an embodiment, the one or more processors are configured to determine whether the set of channels for off-channel scanning can be further pruned based on historical channel utilization of the selected group of wireless APs.

In an embodiment, the one or more processors are configured to determine whether the set of channels for off-channel scanning can be further pruned based on active basic service set (BSS) data gathered by the selected group of wireless APs.

In an embodiment, the one or more processors are configured to cause spectral scans to be performed on the final optimized list of channels for off-channel scanning to detect non-WiFi interference.

In an embodiment, the one or more processors are configured to cause deauthentication frames to be constructed and transmitted by the selected group of wireless APs on the final optimized list of channels for off-channel scanning.

In an embodiment, the one or more processors are configured to cause MAC HW of the selected group of wireless APs to be placed in promiscuous mode to capture different types of frames.

In an embodiment, the channels for off-channel scanning are of three different frequency ranges, and the three different frequency ranges include 2.4 GHz, 5 GHz, and 6 GHz.

In an embodiment, a method for wireless channel scanning involves at a cloud server, building a set of channels for off-channel scanning to be performed by a selected group of wireless APs, where the channels for off-channel scanning are of three different frequency ranges, and where the three different frequency ranges comprise 2.4 GHz, 5 GHz, and 6 GHz, at the cloud server, determining whether the set of channels for off-channel scanning can be further pruned to generate a final optimized list of channels for off-channel scanning based on PSC information, historical channel utilization of the selected group of wireless APs, and active BSS data gathered by the selected group of wireless APs, and at the cloud server, sending the final optimized list of channels for off-channel scanning to the selected group of wireless APs.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
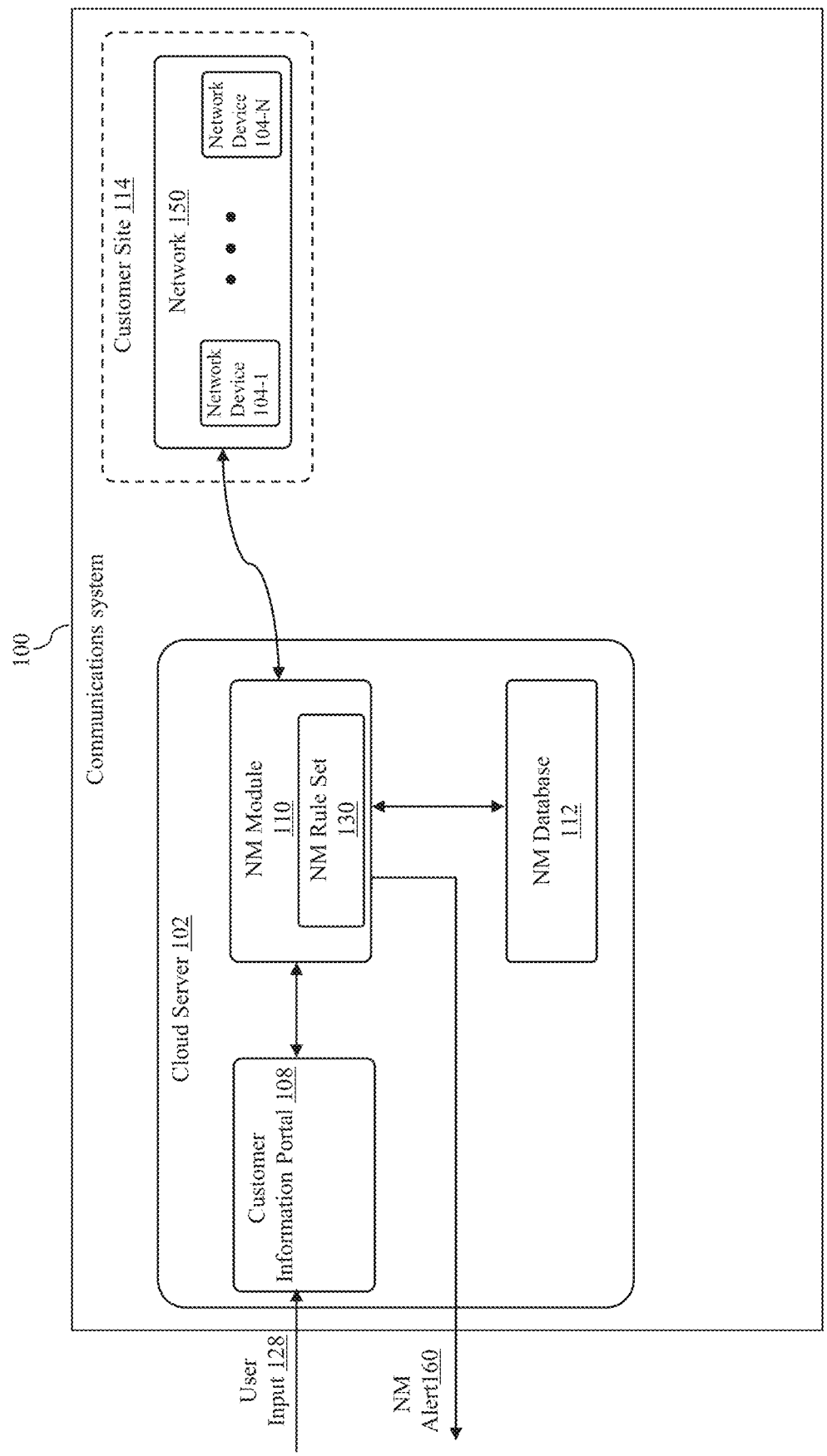
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a wireless channel scanning service to network devices (e.g., the deployed network 150) at the customer site. Because the cloud server can facilitate or perform a wireless channel scanning service to network devices at the customer site, network management efficiency can be improved. In addition, because the cloud server can facilitate or perform a wireless channel scanning service to network devices at the customer site, a user or customer of the customer site can be notified of network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management (NM) module 110, a customer information portal 108 connected to the NM module 110, and an NM database 112 configured to store NM data. The NM module, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NM module, more than one customer information portal, and/or more than one NM database. In another example, although the NM module, the customer information portal, and the NM database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NM module 110 is configured to facilitate or perform a wireless channel scanning service to network devices (e.g., the deployed network 150) at the customer site 114, for example, using a network management (NM) rule set 130. The NM rule set 130 may include one or more NM rules for network devices at the customer site 114, for example, for performing an NM service to network devices at the customer site 114. In some embodiments, the NM module 110 is configured to generate and/or transmit at least one NM alert 160 regarding a network deployed and/or to be deployed at the customer site, for example, to an administrator or a user or customer (e.g., a layperson such as a worker on-site or an end-user such as an employee) at the customer site 114. In some embodiments, the NM database 112 is configured to store NM data for a network deployed and/or to be deployed at the customer site (e.g., a list of network devices deployed or to be deployed at the customer site). For example, the NM database 112 is configured to store NM measurement data and/or a list of specific levels of network availability, coverage and/or capacity for network devices deployed at the customer site 114. In some embodiments, the NM database 112 is configured to store the at least one NM alert 160. Because the NM module can facilitate or perform an NM service (e.g., a wireless channel scanning service) to network devices at the customer site, network management efficiency can be improved. In addition, because the NM module can facilitate or perform an NM service to network devices at the customer site, a user or customer (e.g., a layperson such as a worker on-site or an end-user such as an employee) at the customer site can be notified of network conditions or outrages. Consequently, network outage time can be shortened. The customer information portal 108 is configured to receive customer input 128. In some embodiments, the customer information portal is configured to include or generate a user interface that allows a customer to input information related to the customer site 114 (e.g., the floor plan of the customer site 114) and/or information associated with an NM service (e.g., a wireless channel scanning service) for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, . . . , 104-N is compatible with Institute of Electrical and Electronics Engineers (IEEE) 802.3 protocol and/or one or more wireless local area network (WLAN) communications protocols, such as an IEEE 802.11 protocol, and/or a short-range communications protocol, such as Bluetooth. In some embodiments, at least one of the network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol).

Figure 2:
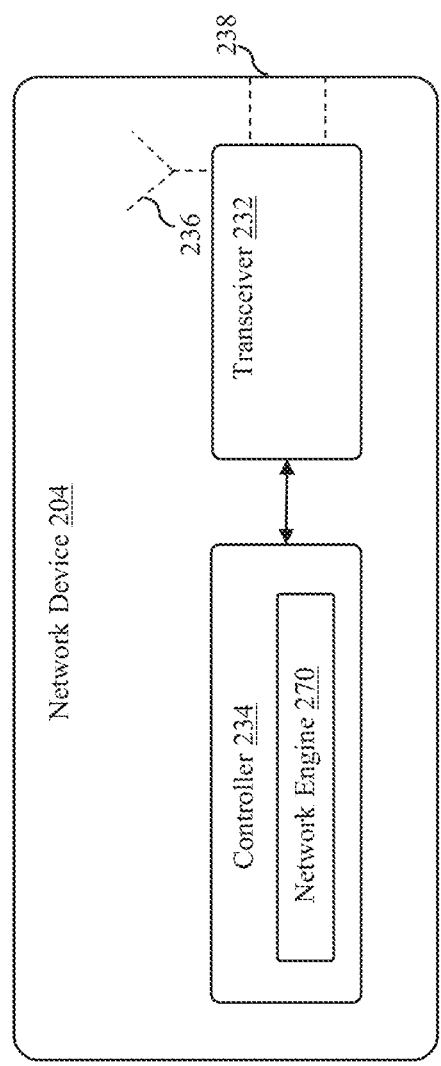
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch (DS), a gateway or headend (HE), an access switch (AS), a wireless access point (AP), a sensor, a laptop, a desktop personal computer (PC), or a mobile phone.

In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wireless communications device that includes at least one wireless transceiver (e.g., the transceiver 232) and at least one antenna (e.g., the antenna 236). In some embodiments, as a wireless device, the network device 204 includes at least one network port (e.g., the network port 238) that is used to connect to another communication device through at least one cable or wire, for example, at least one Ethernet cable. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

In the embodiment depicted in FIG. 2, the network device 204 (e.g., the controller 234) includes a network engine 270 configured to execute one or more communications protocols. In some embodiments, the network engine 470 is configured to execute Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the network engine 270 includes or is implemented using a processor (e.g., a microcontroller, a DSP, and/or a CPU) configured to execute one or more communications protocols (e.g., Layer 3 (L3) protocols), and memory that may store information (e.g., an OS) for the processor. For example, the controller 234 is implemented using a processor and memory, and the network engine 270 is a software module that executes in the processor. In some embodiments, the controller 234 (e.g., the network engine 270) includes a storage device (e.g., one or more hard disks, flash memory modules, solid state disks, and/or optical disks) that contains or stores predefined information (e.g., a predefined security certificate), which may be placed or embedded into the network device 204 during a manufacturing process.

In some embodiments, the network device 204 (e.g., the controller 234) is configured to periodically perform wireless channel scanning for a Wireless Intrusion Prevention System (WIPS), a Wireless Intrusion Detection System (WIDS), channel planning applications, and/or client location related applications. In an embodiment, the network device 204 (e.g., the controller 234) is configured to scan for beacons/probe responses, for example, to detect operating basic service sets (BSSes) on neighboring wireless devices (e.g., wireless APs) in addition to recording channel quality parameters for channel planning and/or WIPS/WIDS (e.g., to detect rogue APs) related use-cases. In an embodiment, the network device 204 (e.g., the controller 234) is configured to scan for specific frames, for example, management frames, control frames, and data frames for WIPS/WIDS (e.g., to detect rogue clients) and/or client location (e.g., received signal strength indication (RSSI) based triangulation) related requirements. In an embodiment, the network device 204 (e.g., the controller 234) is configured to scan for non-Wi-Fi interference (e.g., microwave, jammer, etc.), for example, primarily in 2.4G band, for channel planning and WIPS/WIDS requirements. The network device 204 (e.g., the controller 234) can perform off-channel management frame transmission, for example, transmit deauthentication frames to non-AP stations for rogue AP handling. In some embodiments, the network device 204 (e.g., the controller 234) performs off-channel scanning by tuning its radio or transceiver 232 to a different channel for a finite amount of time, for example, to detect sources of interference, rogue, or unauthorized ad-hoc Wi-Fi networks. The network device 204 (e.g., the controller 234) can operate under station mode, for example, to associate with and/or transmit pings to a neighboring AP for service-level agreement (SLA) related requirements (e.g., as a virtual sensor). The network device 204 (e.g., the controller 234) can perform intelligent wireless channel scanning on various frequency bands (e.g., 6 GHz band with 1200 MHz opened (59 new 20 MHz channels)), to reduce scanning time. For example, with a dwell internal of 100 ms, it can take about 6 seconds approximately to scan through all 59 channels, which may be unacceptable or impracticable for some applications.

Figure 3:
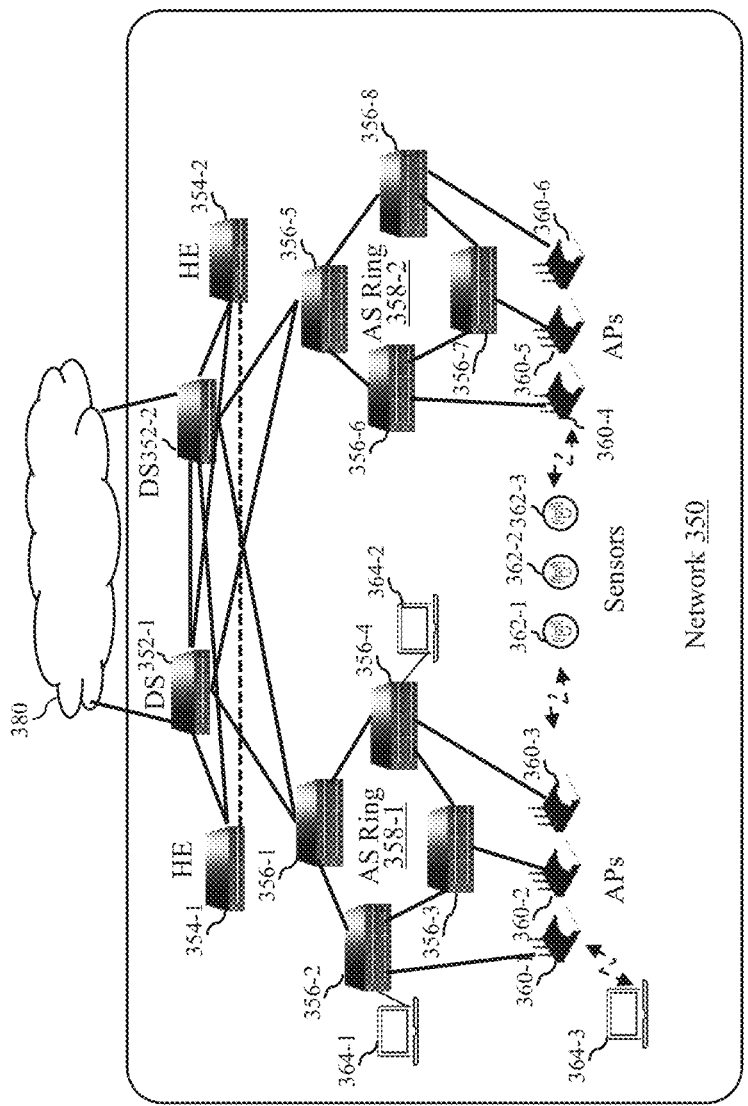
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, a number of wireless sensors 362-1, 362-2, 362-3 that wirelessly connect to the wireless APs, and a number of network devices 364-1, 364-2, 364-3 that are connected to the ASs 356-2, 356-4, and the wireless AP 360-1 through cables or wires, for example, Ethernet cables, or wirelessly. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the network devices 364-1, 364-2, 364-3 may be an embodiment of the network device 204 depicted in FIG. 2. The network devices 364-1, 364-2, 364-3 may be wired and/or wireless devices, for example, laptops, desktop PCs, or other wired devices. In some embodiments, each of the network devices 364-1, 364-2, 364-3 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the network devices 364-1, 364-2, 364-3 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the NM module 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than three network devices, and/or less than three network devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

Figure 4:
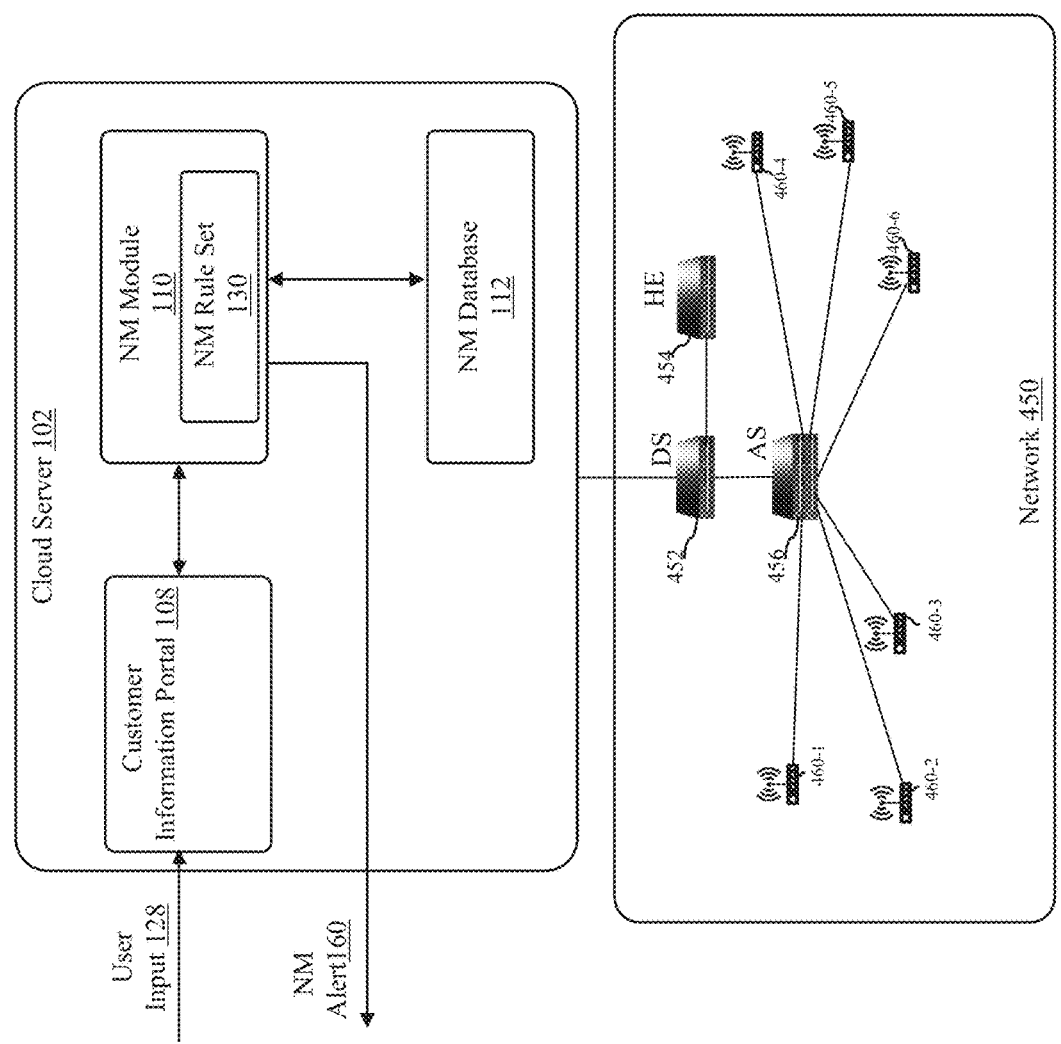
FIG. 4 depicts a network that includes multiple wireless APs and can interact with the cloud server depicted in FIG. 1 for wireless channel scanning.

FIG. 4 depicts a network 450 that includes multiple wireless APs 460-1, 460-2, 460-3, 460-4, 460-5, 460-6 and can interact with the cloud server 102 depicted in FIG. 1 for wireless channel scanning. The network 450 depicted in FIG. 4 is an embodiment of the network 350 depicted in FIG. 3. However, the network 350 depicted in FIG. 3 is not limited to the embodiment depicted in FIG. 4. In the embodiment depicted in FIG. 4, the network 450 includes the wireless APs 460-1, 460-2, 460-3, 460-4, 460-5, 460-6, at least one distribution switch (DS) or distribution layer switch 452 that is an aggregation switch functioning as a bridge between a core layer switch and an access layer switch, at least one head end (HE) or gateway 454, and at least one access switch (AS) 456 that directly interacts with lower-level devices (e.g., wireless APs). The wireless APs 460-1, 460-2, 460-3, 460-4, 460-5, 460-6 may be connected to physical ports (e.g., Ethernet ports) of the AS 456 through network cables (e.g., Ethernet cables). The wireless APs 460-1, 460-2, 460-3, 460-4, 460-5, 460-6 depicted in FIG. 4 may be similar to or the same as the wireless APs 360-1, 360-2, 360-3, 360-4, 360-5, 360-6 depicted in FIG. 3. The DS 452 depicted in FIG. 4 may be similar to or the same as the DSs 352-1, 352-2 depicted in FIG. 3. The HE 454 depicted in FIG. 4 may be similar to or the same as the HEs 354-1, 354-2 depicted in FIG. 3. The AS 456 depicted in FIG. 4 may be similar to or the same as the ASs 356-1, 356-2, 356-3, 356-4, 356-5, 356-6, 356-7, 356-8 depicted in FIG. 3. Although the network 450 is shown in FIG. 4 with certain components and described with certain functionality herein, other embodiments of the network 450 may include fewer or more components to implement the same, less, or more functionality. For example, in some embodiments, the network 450 includes more than one DS, no HE, more than one HE, more than one AS, more than six wireless APs, less than six wireless APs, one or more wireless sensors, and/or one or more network devices. In another example, although the wireless APs 360-1, 360-2, 360-3, 360-4, 360-5, 360-6 are shown in FIG. 4 as being connected to the AS 456, in other embodiments, the wireless APs 360-1, 360-2, 360-3, 360-4, 360-5, 360-6 are connected to different ASs.

In the embodiment depicted in FIG. 4, the wireless APs 460-1, 460-2, 460-3, 460-4, 460-5, 460-6 are configured to perform wireless channel scanning of the network 450. In some embodiments, each of the wireless APs 460-1, 460-2, 460-3, 460-4, 460-5, 460-6 scans airwaves to probe for information from one or more beaconing wireless APs, for example, to generate a scan report of neighboring wireless APs and to transmit the scan report to the cloud server 102 (e.g., the NM module 110 in the cloud server 102). In some embodiments, the cloud server 102 (e.g., the NM module 110 in the cloud server 102) analyzes data (e.g., scan reports) from the wireless APs 460-1, 460-2, 460-3, 460-4, 460-5, 460-6 to perform a management operation to the wireless APs 460-1, 460-2, 460-3, 460-4, 460-5, 460-6. For example, the cloud server 102 (e.g., the NM module 110 in the cloud server 102) analyzes data (e.g., scan reports) from the wireless APs 460-1, 460-2, 460-3, 460-4, 460-5, 460-6 to control wireless channel scanning operations (e.g., adjust time duration and/or channel of wireless channel scanning) of the wireless APs 460-1, 460-2, 460-3, 460-4, 460-5, 460-6. Consequently, under varying wireless channel conditions and interference, wireless channel scanning can be efficiently implemented.

In an example wireless channel scanning operation of the network 450 depicted in FIG. 4, the wireless APs 460-1, 460-2, 460-3, 460-4, 460-5, 460-6 conduct airwave probe and wireless channel scanning. Each of the wireless APs 460-1, 460-2, 460-3, 460-4, 460-5, 460-6 may operate under a station mode in which the wireless AP behaves similar to a wireless station (STA) and associates with another wireless AP, for example, by enabling a station (STA) interface of the wireless AP. Under the station mode, the wireless AP may behave similar to a wireless station (STA) and associates with and/or transmits pings to a neighboring AP for SLA related requirements, e.g., as a virtual sensor. Alternatively, each of the wireless APs 460-1, 460-2, 460-3, 460-4, 460-5, 460-6 may operate under an AP mode in which the wireless AP does not associate with any another wireless AP, for example, by disabling a station (STA) interface of the wireless AP. Each of the wireless APs 460-1, 460-2, 460-3, 460-4, 460-5, 460-6 may perform a WLAN scan (e.g., an 802.11 scan or a dot11 scan) to detect WiFi (also referred to as Wi-Fi, wifi) interference, which is wireless interference in frequency bands used by IEEE 802.11 protocols, or a spectral scan to detect non-WiFi interference (e.g., microwave, jammer, etc.). For example, each of the wireless APs 460-1, 460-2, 460-3, 460-4, 460-5, 460-6 may perform passive scan with medium access control (MAC) hardware (HW) in promiscuous mode to capture all types of frames (e.g., data frames, management frames, and control frames), which are not limited to beacons and probe responses to satisfy channel planning, WIPS/WIDS, and client location use cases. In promiscuous mode, the MAC HW allows all frames through such that frames intended for other network devices can be read by the wireless AP. Channel quality parameters (noise figure (NF), channel utilization, etc.) may be accessed as well from the received frames. In some embodiments, each of the wireless APs 460-1, 460-2, 460-3, 460-4, 460-5, 460-6 performs off-channel scanning by tuning its radio or transceiver to a different channel for a finite amount of time, for example, to detect sources of interference, rogue, or unauthorized ad-hoc Wi-Fi networks. Each of the wireless APs 460-1, 460-2, 460-3, 460-4, 460-5, 460-6 may send deauthentication frames as off-channel transmissions at the start of a scan dwell to a list of clients operating on that channel, if any, for rogue AP handling, which can reduce or eliminate the need for scheduling separate dwell intervals for doing off-channel management frame transmissions. Each of the wireless APs 460-1, 460-2, 460-3, 460-4, 460-5, 460-6 may dynamically adjust the dwell time for a given channel for a given dot11 scan schedule based on number of BSSes discovered on a given channel from a previous dot11 scans. For example, the higher the number of BSSes are discovered, the larger the channel dwell time is, and vice-versa. Each of the wireless APs 460-1, 460-2, 460-3, 460-4, 460-5, 460-6 may perform spectral scan, which may be scheduled at the end of each dot11 scan dwell itself, for a given channel to scan for non-WiFi interference (microwave, jammer, etc.) to minimize channel switch delays when compared to scheduling dot11 and spectral scans separately for the same list of channels. Each of the wireless APs 460-1, 460-2, 460-3, 460-4, 460-5, 460-6 may serve channel dwell for any active STA interface. In addition to dot11 scans and spectral scans, each of the wireless APs 460-1, 460-2, 460-3, 460-4, 460-5, 460-6 may serve channel dwell for an appropriate time interval at the end of each off-channel scan dwell when a STA interface is enabled, for example, to satisfy the additional requirement to reserve adequate time slots to transmit/receive frames if the STA interface is created and associated to any neighboring AP on the scanning radio.

Figure 5:
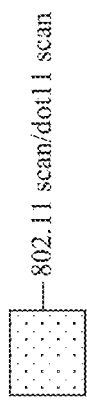
FIG. 5 depicts a wireless channel scanning diagram of one of the wireless APs in the network depicted in FIG. 4.
Figure 5:

FIG. 5 depicts a wireless channel scanning diagram 500 of one of the wireless APs 460-1, 460-2, 460-3, 460-4, 460-5, 460-6 in the network 450 depicted in FIG. 4. In the wireless channel scanning diagram 500 depicted in FIG. 5, the wireless AP operates under the AP mode to scan wireless channels 1-165, and the station interface of the wireless AP is disabled. Although the wireless channel scanning diagram 500 in FIG. 5 depicts 165 channels, in other embodiments, the wireless channel scanning diagram 500 includes a subset of channels 1-165 or additional channels and the wireless AP scans fewer than channels 1-165 or additional channels.

As shown in FIG. 5, the wireless AP starts with performing a WLAN scan (e.g., an 802.11 scan/a dot11 scan) of channel 1 to detect WiFi interference, which is wireless interference in frequency bands used by IEEE 802.11 protocols, and a spectral scan of channel 1 to detect non-WiFi interference (e.g., microwave, jammer, etc.). The WLAN scan of channel 1 may start with off-channel scan (e.g., sending deauthentication frames as off-channel transmissions at the start of the WLAN scan to a list of clients operating on channel 1, if any, for rogue AP handling, which can reduce or eliminate the need for scheduling separate dwell intervals for doing off-channel management frame transmissions). Subsequently, the wireless AP performs a WLAN scan (e.g., an 802.11 scan/a dot11 scan) of channel 2 to detect WiFi interference and a spectral scan of channel 2 to detect non-WiFi interference (e.g., microwave, jammer, etc.). The WLAN scan of channel 2 may start with off-channel scan (e.g., sending deauthentication frames as off-channel transmissions at the start of the WLAN scan to a list of clients operating on channel 2, if any, for rogue AP handling, which can reduce or eliminate the need for scheduling separate dwell intervals for doing off-channel management frame transmissions). Subsequently, the wireless AP performs a WLAN scan (e.g., an 802.11 scan/a dot11 scan) of channel 3-165 to detect WiFi interference. The WLAN scan of channel 3-165 may start with off-channel scan (e.g., sending deauthentication frames as off-channel transmissions at the start of the WLAN scan to a list of clients operating on that channel, if any, for rogue AP handling, which can reduce or eliminate the need for scheduling separate dwell intervals for doing off-channel management frame transmissions).

After the WLAN scan of channel 165 is completed, the wireless AP repeats the scanning pattern. Specifically, the wireless AP starts with performing a WLAN scan (e.g., an 802.11 scan/a dot11 scan) of channel 1 to detect WiFi interference and a spectral scan of channel 1 to detect non-WiFi interference. The WLAN scan of channel 1 may start with off-channel scan. Subsequently, the wireless AP performs a WLAN scan (e.g., an 802.11 scan/a dot11 scan) of channel 2 to detect WiFi interference and a spectral scan of channel 2 to detect non-WiFi interference. The WLAN scan of channel 2 may start with off-channel scan. Subsequently, the wireless AP performs a WLAN scan (e.g., an 802.11 scan/a dot11 scan) of channel 3-165 to detect WiFi interference. The WLAN scan of channel 3-165 may start with off-channel scan.

Figure 6:
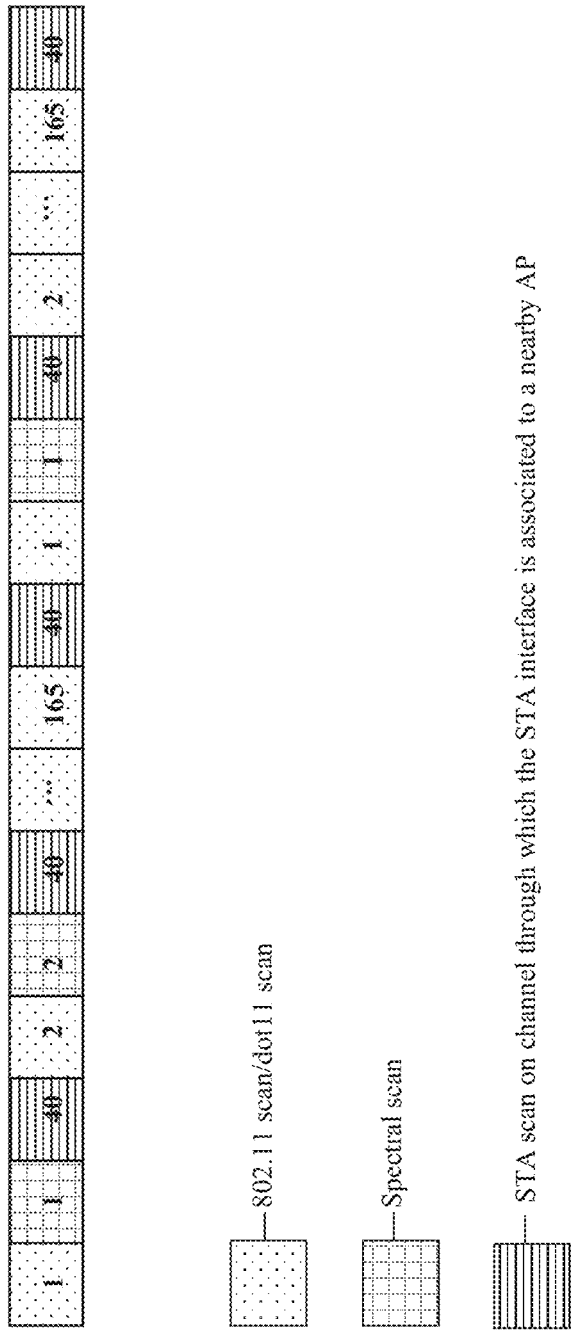
FIG. 6 depicts another wireless channel scanning diagram of one of the wireless APs in the network depicted in FIG. 4.

FIG. 6 depicts a wireless channel scanning diagram 600 of one of the wireless APs 460-1, 460-2, 460-3, 460-4, 460-5, 460-6 in the network 450 depicted in FIG. 4. In the wireless channel scanning diagram 600 depicted in FIG. 6, the wireless AP operates under the station (STA) mode to scan wireless channels 1-165, the station interface of the wireless AP is enabled, and the wireless AP is associated to a nearby wireless AP on a wireless channel (e.g., channel 40). Although the wireless channel scanning diagram 600 in FIG. 6 depicts 165 channels, in other embodiments, the wireless channel scanning diagram 600 includes a subset of channels 1-165 or additional channels and the wireless AP scans fewer than channels 1-165 or additional channels.

As shown in FIG. 6, the wireless AP starts with performing a WLAN scan (e.g., an 802.11 scan/a dot11 scan) of channel 1 to detect WiFi interference, which is wireless interference in frequency bands used by IEEE 802.11 protocols, and a spectral scan of channel 1 to detect non-WiFi interference (e.g., microwave, jammer, etc.). The WLAN scan of channel 1 may start with off-channel scan (e.g., sending deauthentication frames as off-channel transmissions at the start of the WLAN scan to a list of clients operating on channel 1, if any, for rogue AP handling, which can reduce or eliminate the need for scheduling separate dwell intervals for doing off-channel management frame transmissions). Subsequently, the wireless AP behaves as a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40). Subsequently, the wireless AP performs a WLAN scan (e.g., an 802.11 scan/a dot11 scan) of channel 2 to detect WiFi interference and a spectral scan of channel 2 to detect non-WiFi interference (e.g., microwave, jammer, etc.). The WLAN scan of channel 2 may start with off-channel scan (e.g., sending deauthentication frames as off-channel transmissions at the start of the WLAN scan to a list of clients operating on channel 2, if any, for rogue AP handling, which can reduce or eliminate the need for scheduling separate dwell intervals for doing off-channel management frame transmissions). Subsequently, the wireless AP behaves similar to a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40). Subsequently, the wireless AP performs a WLAN scan (e.g., an 802.11 scan/a dot11 scan) of channel 3-165, which may not include channel 40, to detect WiFi interference. The WLAN scan of channel 3-165 may start with off-channel scan (e.g., sending deauthentication frames as off-channel transmissions at the start of the WLAN scan to a list of clients operating on that channel, if any, for rogue AP handling, which can reduce or eliminate the need for scheduling separate dwell intervals for doing off-channel management frame transmissions). Subsequently, the wireless AP behaves similar to a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40).

After the STA scan of channel 40 is completed, the wireless AP repeats the scanning pattern. Specifically, the wireless AP starts with performing a WLAN scan (e.g., an 802.11 scan/a dot11 scan) of channel 1 to detect WiFi interference and a spectral scan of channel 1 to detect non-WiFi interference. The WLAN scan of channel 1 may start with off-channel scan. Subsequently, the wireless AP behaves similar to a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40). Subsequently, the wireless AP performs a WLAN scan (e.g., an 802.11 scan/a dot11 scan) of channel 2 to detect WiFi interference and a spectral scan of channel 2 to detect non-WiFi interference. The WLAN scan of channel 2 may start with off-channel scan. Subsequently, the wireless AP behaves similar to a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40). Subsequently, the wireless AP performs a WLAN scan (e.g., an 802.11 scan/a dot11 scan) of channel 3-165, which may not include channel 40, to detect WiFi interference. The WLAN scan of channel 3-165 may start with off-channel scan. Subsequently, the wireless AP behaves similar to a wireless station (STA) and associates with and/or transmits pings to a neighboring AP for SLA related requirements, e.g., as a virtual sensor, on the wireless channel on which the STA interface of the wireless AP is associated to a nearby AP (e.g., channel 40).

Figure 7:
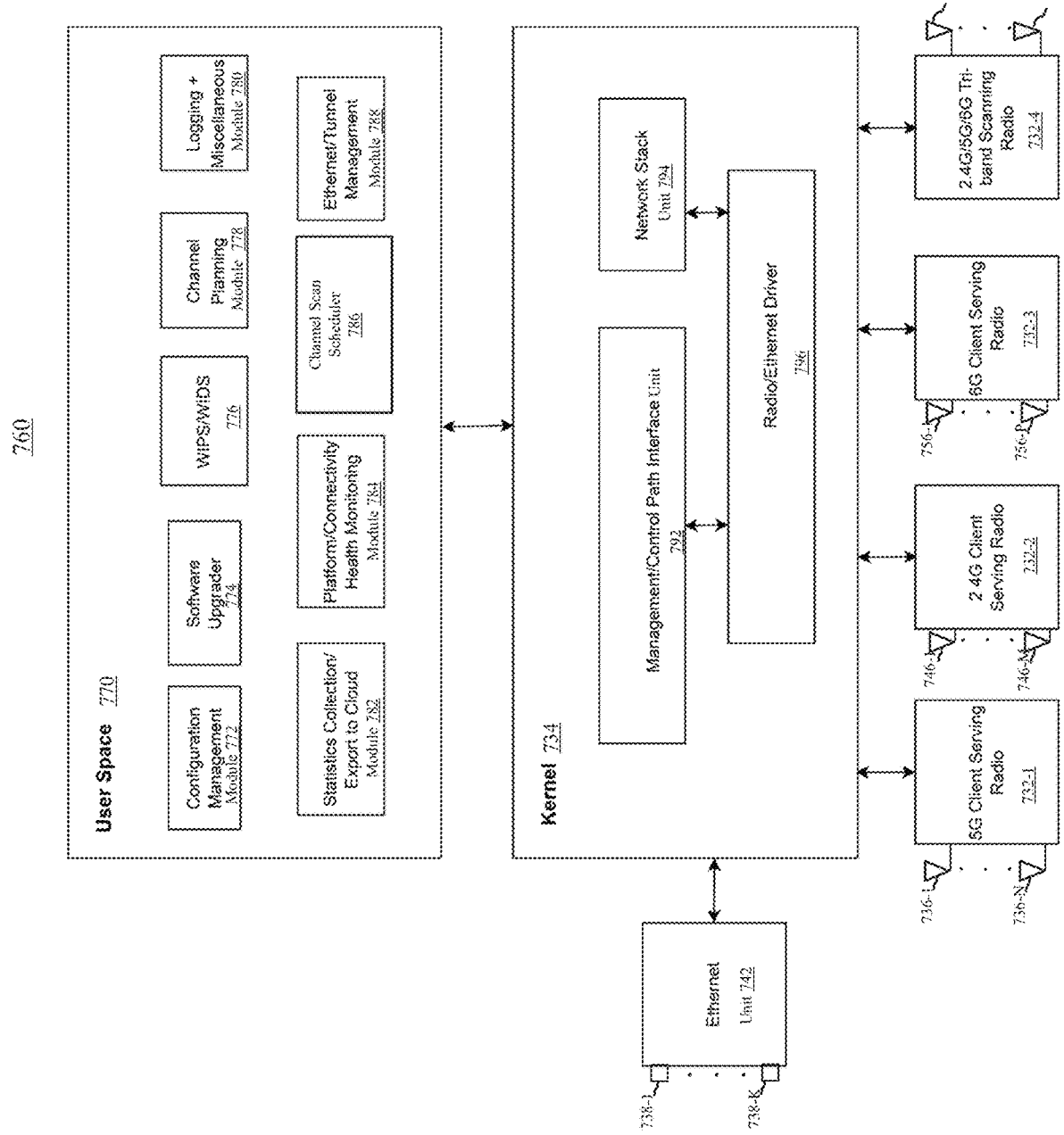
FIG. 7 depicts an embodiment of a wireless AP that can be included in the network depicted in FIG. 4.

FIG. 7 depicts an embodiment of a wireless AP 760 that can be included in the network 450 depicted in FIG. 4. The wireless AP 760 is an embodiment of the wireless APs 460-1, 460-2, 460-3, 460-4, 460-5, 460-6 of the network 450 depicted in FIG. 4. However, the wireless APs 460-1, 460-2, 460-3, 460-4, 460-5, 460-6 of the network 450 depicted in FIG. 4 are not limited to the embodiment depicted in FIG. 7. In the embodiment depicted in FIG. 7, the wireless AP 760 includes a 5 GHz client serving radio 732-1 with an antenna array of one or more antennas 736-1, . . . , 736-N (N is a positive integer), a 2.4 GHz client serving radio 732-2 with an antenna array of one or more antennas 746-1, . . . , 746-M (M is a positive integer), a 6 GHz client serving radio 732-3 with an antenna array of one or more antennas 756-1, . . . , 756-P (P is a positive integer), a 2.4 GHz/5 GHz/6 GHz tri-band scanning radio 732-4 with an antenna array of one or more antennas 766-1, . . . , 766-Q (Q is a positive integer), an Ethernet unit 742, a kernel 734, and a user space 770 with user space applications 772, 774, 776, 778, 780, 782, 784, 786, 788. Each of the 5 GHz client serving radio 732-1, the 2.4 GHz client serving radio 732-2, the 6 GHz client serving radio 732-3, and the 2.4 GHz/5 GHz/6 GHz tri-band scanning radio 732-4 may include radio frequency (RF) frontend and/or transceiver. The antennas 736-1, . . . , 736-N, 746-1, . . . , 746-M, 756-1, . . . , 756-P, 766-1, . . . , 766-Q may be any suitable type of antennas. For example, the antennas include at least one induction type antenna such as a loop antenna or any other suitable type of induction type antenna. However, the antennas that can be used in the wireless AP 760 is not limited to an induction type antenna. The Ethernet unit 742 may be an Ethernet transceiver that is connected to one or more network ports 738-1, . . . , 738-K (K is a positive integer) that can be connected to other network element(s), such as, a switch (e.g., an AS or a DS) or a router. The network ports 738-1, . . . , 738-K may be any suitable type of ports. For example, the network ports 738-1, . . . , 738-K may be LAN network ports, such as, Ethernet ports. However, the network ports 738-1, . . . , 738-K are not limited to LAN network ports. Although the wireless AP 760 is shown in FIG. 7 with certain components and described with certain functionality herein, other embodiments of the wireless AP 760 may include fewer or more components to implement the same, less, or more functionality. For example, in some embodiments, the wireless AP 760 includes storage or memory such as Dynamic random-access memory (DRAM) or flash and/or a clock (CLK) unit. In another example, in some embodiments, the wireless AP 760 includes more RF frontends or transceivers having more frequency bands or fewer RF frontends or transceivers having fewer frequency bands.

In the embodiment depicted in FIG. 7, the kernel 734 includes a management/control path interface 792 configured to provide a management or control interface, a network stack unit 794 configured to store or manage network protocol information, and a radio/Ethernet driver 796 configured to control or drive the 5 GHz client serving radio 732-1, the 2.4 GHz client serving radio 732-2, the 6 GHz client serving radio 732-3, the 2.4 GHz/5 GHz/6 GHz tri-band scanning radio 732-4, and the Ethernet unit 742. The management/control path interface 792, the network stack unit 794, and the radio/Ethernet driver 796 may be implemented in hardware (e.g., circuits), software, firmware, or a combination thereof. In some embodiments, the kernel 734 is implemented with a controller, which may include a processor (e.g., a microcontroller, a DSP, and/or a CPU) and memory that may store information (e.g., an OS) for the processor. For example, the kernel 734 may be implemented by a system-on-chip (SoC) that may be an application-specific integrated circuit (ASIC).

In the embodiment depicted in FIG. 7, the user space 770 contains or stores user space applications, which include a configuration management module 772 configured to perform network and/or device configuration management functions, a software updater 774 configured to perform software update functions, a Wireless Intrusion Prevention System (WIPS)/Wireless Intrusion Detection System (WIDS) 776, a channel planning module 778 configured to perform channel planning functions, a logging & miscellaneous module 780 configured to perform log and other functions, a statistics collection/cloud export module 782 configured to perform statistics collection and cloud export functions, a platform/connectivity health monitoring module 784 configured to perform platform and/or connectivity health monitoring functions, a channel scanning scheduler 786 configured to perform wireless channel scanning functions, and an Ethernet/tunnel management module 788 configured to perform Ethernet and/or tunnel management functions. The configuration management module 772, the software updater 774, the WIPS/WIDS 776, the channel planning module 778, the logging & miscellaneous module 780, the statistics collection/cloud export module 782, the platform/connectivity health monitoring module 784, the channel scanning scheduler 786, and the Ethernet/tunnel management module 788 may be implemented in hardware (e.g., circuits), software, firmware, or a combination thereof. For example, the kernel 734 is implemented using a processor and memory, and the configuration management module 772, the software updater 774, the WIPS/WIDS 776, the channel planning module 778, the logging & miscellaneous module 780, the statistics collection/cloud export module 782, the platform/connectivity health monitoring module 784, the channel scanning scheduler 786, and the Ethernet/tunnel management module 788 are software modules that execute in the processor.

In some embodiments, the channel scanning scheduler 786 is configured to schedule wireless channel scanning of the wireless AP 760. For example, the channel scanning scheduler 786 may control wireless channel scanning operations (e.g., adjust time duration and/or channel of wireless channel scanning) of the wireless AP 760. Consequently, under varying wireless channel conditions and interference, wireless channel scanning can be efficiently implemented. The channel scanning scheduler 786 may enable or disable a station mode in which the wireless AP 760 behaves similar to a wireless station (STA) and associates with another wireless AP, for example, by enabling a station (STA) interface of the wireless AP 760. Under the station mode, the wireless AP 760 may behave similar to a wireless station (STA) and associates with and/or transmits pings to a neighboring AP for SLA related requirements, e.g., as a virtual sensor. The channel scanning scheduler 786 may enable or disable an AP mode in which the wireless AP 760 does not associate with any another wireless AP, for example, by disabling a station (STA) interface of the wireless AP 760. In some embodiments, the channel scanning scheduler 786 is configured to schedule a WLAN scan (e.g., an 802.11 scan or a dot11 scan) to detect WiFi interference, which is wireless interference in frequency bands used by IEEE 802.11 protocols, or a spectral scan to detect non-WiFi interference (e.g., microwave, jammer, etc.). For example, the channel scanning scheduler 786 may schedule passive scan with MAC HW in promiscuous mode to capture all types of frames (e.g., data frames, management frames, and control frames), which are not limited to beacons and probe responses to satisfy channel planning, WIPS/WIDS, and client location use cases. In promiscuous mode, the MAC HW allows all frames through such that frames intended for other network devices can be read by the wireless AP 760. Channel quality parameters (noise figure (NF), channel utilization, etc.) may be accessed as well from the received frames. In some embodiments, the wireless AP 760 (e.g., the channel scanning scheduler 786) performs off-channel scanning by tuning its radio or transceiver (e.g., the 2.4 GHz/5 GHz/6 GHz tri-band scanning radio 732-4) to a different channel for a finite amount of time, for example, to detect sources of interference, rogue, or unauthorized ad-hoc Wi-Fi networks. The channel scanning scheduler 786 may cause deauthentication frames to be sent by a radio or transceiver (e.g., the 2.4 GHz/5 GHz/6 GHz tri-band scanning radio 732-4) as off-channel transmissions at the start of a scan dwell to a list of clients operating on that channel, if any, for rogue AP handling, which can reduce or eliminate the need for scheduling separate dwell intervals for doing off-channel management frame transmissions. The channel scanning scheduler 786 may dynamically adjust the dwell time for a given channel for a given dot11 scan schedule based on number of BSSes discovered on a given channel from a previous dot11 scans. For example, the higher the number of BSSes are discovered, the larger the channel dwell time is, and vice-versa. The channel scanning scheduler 786 may schedule spectral scan at the end of each dot11 scan dwell itself, for a given channel to scan for non-WiFi interference (microwave, jammer, etc.) to minimize channel switch delays when compared to scheduling dot11 and spectral scans separately for the same list of channels. The channel scanning scheduler 786 may serve channel dwell for any active STA interface. In addition to dot11 scans and spectral scans, the channel scanning scheduler 786 may serve channel dwell for an appropriate time interval at the end of each off-channel scan dwell when a STA interface is enabled, for example, to satisfy the additional requirement to reserve adequate time slots to transmit/receive frames if the STA interface is created and associated to any neighboring AP on the scanning radio.

In some embodiments, a controller (e.g., the channel scanning scheduler 786 and/or the radio/Ethernet driver 796) of the wireless AP 760 is configured to using a scanning RF frontend (e.g., the 2.4 GHz/5 GHz/6 GHz tri-band scanning radio 732-4), perform a wireless local area network (WLAN) scan and a spectral scan on a first channel of a channel scan list, and using the scanning RF frontend, perform the WLAN scan and the spectral scan on a second channel of the channel scan list after the WLAN scan and the spectral scan on the first channel are completed. In some embodiments, the controller (e.g., the channel scanning scheduler 786 and/or the radio/Ethernet driver 796) of the wireless AP 760 is further configured to using the scanning RF frontend, perform the WLAN scan on the first channel of the channel scan list to detect WiFi interference, and using the scanning RF frontend, perform the spectral scan on the first channel of the channel scan list to detect non-WiFi interference. In some embodiments, the controller (e.g., the channel scanning scheduler 786 and/or the radio/Ethernet driver 796) of the wireless AP 760 is further configured to using the scanning RF frontend, perform an off-channel scan on the first channel of the channel scan list. In some embodiments, the controller (e.g., the channel scanning scheduler 786 and/or the radio/Ethernet driver 796) of the wireless AP 760 is further configured to using the scanning RF frontend, construct and transmit at least one deauthentication frame to at least one device on the first channel of the channel scan list. In some embodiments, the controller (e.g., the channel scanning scheduler 786 and/or the radio/ Ethernet driver 796) of the wireless AP 760 is further configured to place medium access control (MAC) hardware (HW) in promiscuous mode to capture different types of frames. In some embodiments, the controller (e.g., the channel scanning scheduler 786 and/or the radio/Ethernet driver 796) of the wireless AP 760 is further configured to place a wireless network interface of the wireless AP in station (STA) scanning mode in which the wireless AP behaves as a wireless station. In some embodiments, the controller (e.g., the channel scanning scheduler 786 and/or the radio/Ethernet driver 796) of the wireless AP 760 is further configured to using the scanning RF frontend, associate with or transmit at least one ping to a neighboring wireless AP on a channel of the channel scan list for a service-level agreement (SLA) requirement.

Figure 8:
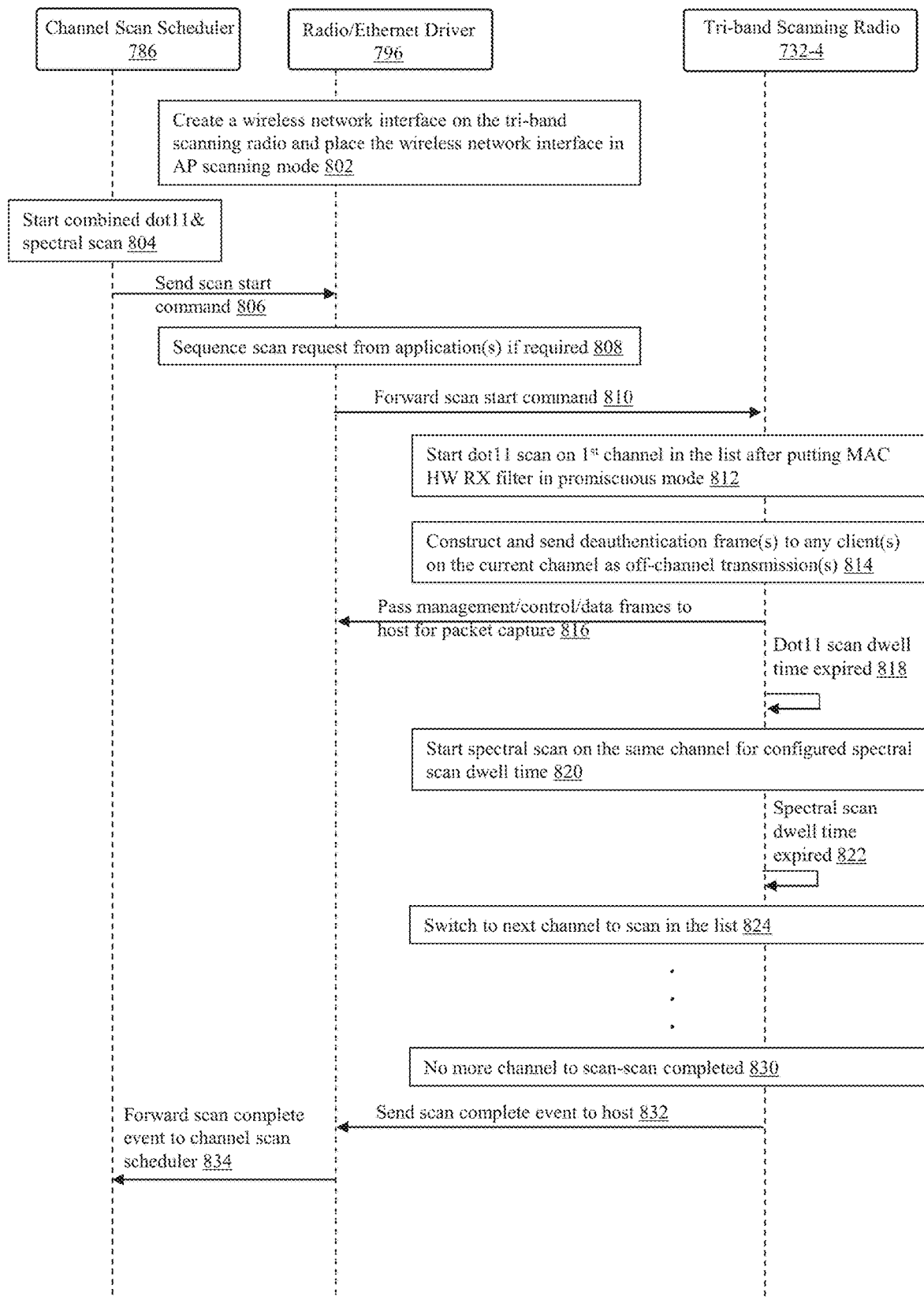
FIG. 8 shows a swim-lane diagram illustrating an example wireless scanning procedure under AP mode.

FIG. 8 shows a swim-lane diagram illustrating an example wireless scanning procedure under AP mode, which can take places between the channel scanning scheduler 786, the radio/Ethernet driver 796, and the 2.4 GHz/5 GHz/6 GHz tri-band scanning radio 732-4 of the wireless AP 760 depicted in FIG. 7. Although operations in the example procedure in FIG. 8 are described in a particular order, in some embodiments, the order of the operations in the example procedure may be altered so that certain operations may be performed in an inverse order or so that certain operations may be performed, at least in part, concurrently with other operations.

In the example wireless scanning procedure depicted in FIG. 8, the wireless AP 760 operates under AP mode and no STA interface is enabled. The wireless scanning procedure starts at operation 802, the radio/Ethernet driver 796 creates a wireless network interface on the tri-band scanning radio 732-4 and places the wireless network interface in AP scanning mode. At operation 804, the channel scanning scheduler 786 starts combined dot11 and spectral scan (e.g., generates a list of channels, dot11 scan dwell time/channel, a de-authentication client list, spectral scan dwell time/ channel). At operation 806, the channel scanning scheduler 786 sends a scan start command to the tri-band scanning radio 732-4. The tri-band scanning radio 732-4 may sequence received scan start commands if required at operation 808. At operation 810, the tri-band scanning radio 732-4 forwards the scan start command, which may be sequenced, to the tri-band scanning radio 732-4. After receiving the scan start command, the tri-band scanning radio 732-4 performs wireless channel scanning as instructed. At operation 812, the tri-band scanning radio 732-4 starts dot11 scan on $1^{st}$ channel in the list after putting MAC HW RX filter in promiscuous mode. In promiscuous mode, the MAC HW allows all frames through such that frames intended for other network devices can be read by the wireless AP 760. At operation 814, the tri-band scanning radio 732-4 constructs and sends deauthentication frame(s) to any client(s) on the current channel ($1^{st}$ channel) as off-channel transmission(s). At operation 816, the tri-band scanning radio 732-4 passes or transmits management/control/data frames to the host (i.e., the radio/Ethernet driver 796) for packet capture. At operation 816, the tri-band scanning radio 732-4 passes or transmits management/control/data frames to the host (i.e., the radio/Ethernet driver 796) for packet capture. At operation 818, the tri-band scanning radio 732-4 determines that dot11 scan dwell time for $1^{st}$ channel has expired and starts spectral scan on the same channel ($1^{st}$ channel) for configured spectral scan dwell time at operation 820. At operation 822, the tri-band scanning radio 732-4 determines that spectral scan dwell time for $1^{st}$ channel has expired and switches to next channel (e.g., $2^{nd}$ channel) to scan in the scan channel list at operation 824 (for example, by performing operations 812, 814, 816, 818, 820, 822 for the next channel). At operation 830, the tri-band scanning radio 732-4 determines that no more channel to scan in the scan channel list (e.g., embedded or contained in the scan start command) and the wireless channel scan is completed. At operation 832, the tri-band scanning radio 732-4 sends a scan complete event to the host (i.e., the radio/Ethernet driver 796), which forwards the scan complete event to the channel scanning scheduler 786 at operation 834.

Figure 9:
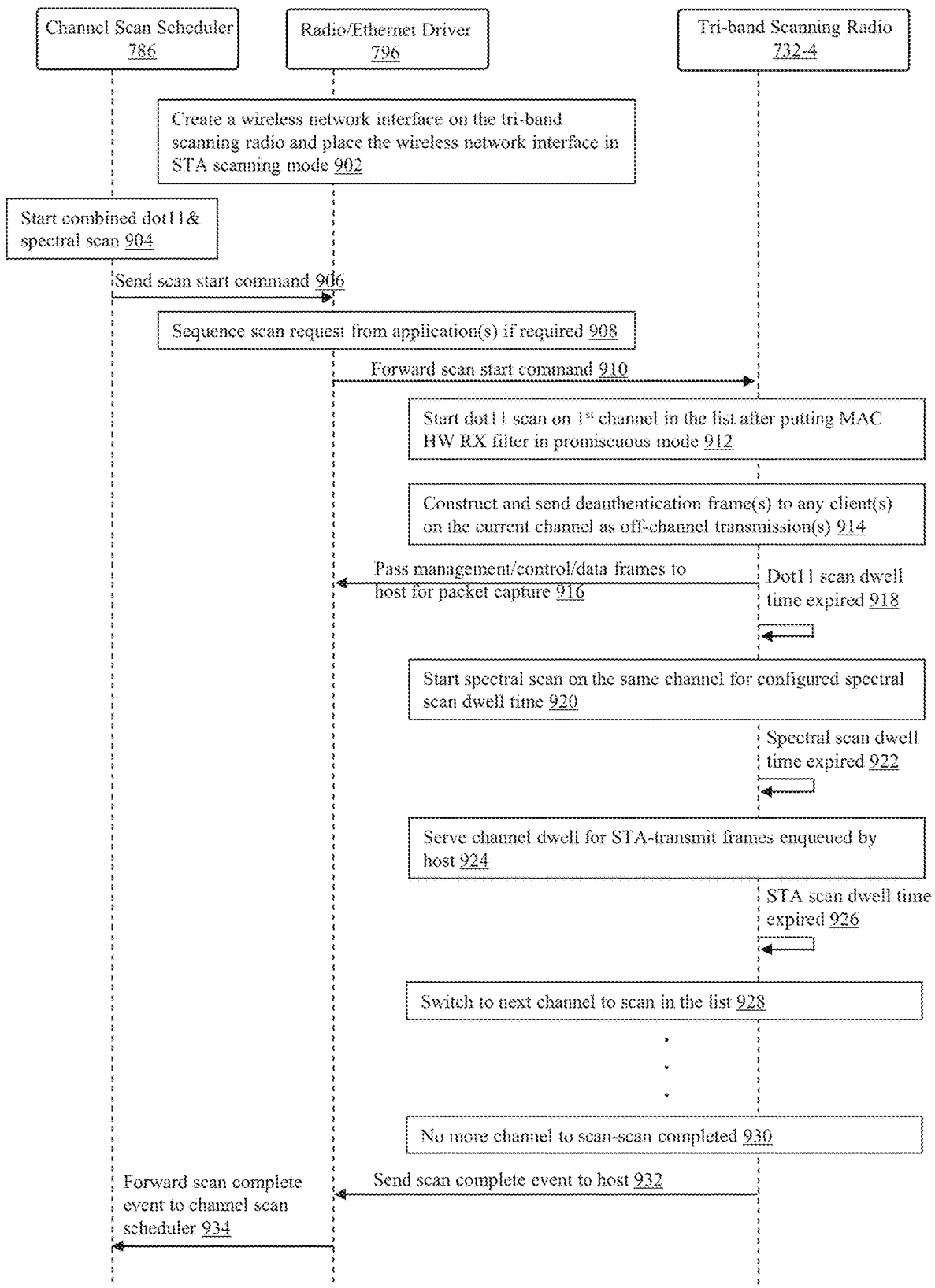
FIG. 9 shows a swim-lane diagram illustrating an example wireless scanning procedure under station (STA) mode.

FIG. 9 shows a swim-lane diagram illustrating an example wireless scanning procedure under STA mode, which can take places between the channel scanning scheduler 786, the radio/Ethernet driver 796, and the 2.4 GHz/5 GHz/6 GHz tri-band scanning radio 732-4 of the wireless AP 760 depicted in FIG. 7. Although operations in the example procedure in FIG. 9 are described in a particular order, in some embodiments, the order of the operations in the example procedure may be altered so that certain operations may be performed in an inverse order or so that certain operations may be performed, at least in part, concurrently with other operations.

In the example wireless scanning procedure depicted in FIG. 9, the wireless AP 760 operates under STA mode and a STA interface is enabled. The wireless scanning procedure starts at operation 902, the radio/Ethernet driver 796 creates a wireless network interface on the tri-band scanning radio 732-4 and places the wireless network interface in STA scanning mode. At operation 904, the channel scanning scheduler 786 starts combined dot11 and spectral scan (e.g., generates a list of channels, dot11 scan dwell time/channel, a de-authentication client list, spectral scan dwell time/channel). At operation 906, the channel scanning scheduler 786 sends a scan start command to the tri-band scanning radio 732-4. The tri-band scanning radio 732-4 may sequence received scan start commands if required at operation 908. At operation 910, the tri-band scanning radio 732-4 forwards the scan start command, which may be sequenced, to the tri-band scanning radio 732-4. After receiving the scan start command, the tri-band scanning radio 732-4 performs wireless channel scanning as instructed. At operation 912, the tri-band scanning radio 732-4 starts dot11 scan on $1^{st}$ channel in the list after putting MAC HW RX filter in promiscuous mode. In promiscuous mode, the MAC HW allows all frames through such that frames intended for other network devices can be read by the wireless AP 760. At operation 914, the tri-band scanning radio 732-4 constructs and sends deauthentication frame(s) to any client(s) on the current channel ($1^{st}$ channel) as off-channel transmission(s). At operation 916, the tri-band scanning radio 732-4 passes or transmits management/control/data frames to the host (i.e., the radio/Ethernet driver 796) for packet capture. At operation 916, the tri-band scanning radio 732-4 passes or transmits management/control/data frames to the host (i.e., the radio/Ethernet driver 796) for packet capture. At operation 918, the tri-band scanning radio 732-4 determines that dot11 scan dwell time for $1^{st}$ channel has expired and starts spectral scan on the same channel ($1^{st}$ channel) for configured spectral scan dwell time at operation 920. At operation 922, the tri-band scanning radio 732-4 determines that spectral scan dwell time for $1^{st}$ channel has expired and starts STA scan on the same channel ($1^{st}$ channel) for configured STA scan dwell time at operation 924. At operation 926, the tri-band scanning radio 732-4 determines that STA scan dwell time for $1^{st}$ channel has expired and switches to next channel (e.g., $2^{nd}$ channel) to scan in the scan channel list at operation 928 (for example, by performing operations 912, 914, 916, 918, 920, 922, 924, 926 for the next channel). At operation 930, the tri-band scanning radio 732-4 determines that no more channel to scan in the scan channel list (e.g., embedded or contained in the scan start command) and the wireless channel scan is completed. At operation 932, the tri-band scanning radio 732-4 sends a scan complete event to the host (i.e., the radio/Ethernet driver 796), which forwards the scan complete event to the channel scanning scheduler 786 at operation 934.

In some embodiments, a cloud centralized off-channel scanning is performed by, for example, the cloud server 102 (e.g., the NM module 110) depicted in FIG. 1. As 59 new 20 MHz channels are opened up and available in 6 GHz band, it is imperative to have an intelligent mechanism to scan through all of the channels to suitably time bound the overall scan period. For example, a channel planning function likely allocates at-least 80 MHz wide channels for 6 GHz APs with the primary 20 MHz channel on a preferred scanning channel (PSC) and greater odds of recording broadcast probe requests from clients that are not permitted to be transmitted in non-PSC channels in 6 GHz band. The cloud server 102 (e.g., the NM module 110) may schedule off-channels scans on preferred scanning channels (PSCs) more frequently than non-preferred scanning channels. In some embodiments, the cloud server 102 (e.g., the NM module 110) dynamically deduces per channel scan dwells for a group of wireless APs at a given instance of time, based on, for example, the number of active BSS and/or transmission (Tx)/receiver (Rx) channel utilization recorded historically. Cloud centralized off-channel scanning can be extended to other frequency band, for example, 5 GHz band, as well. The cloud server 102 (e.g., the NM module 110) may have better view of a RF neighborhood for a given tenant, the cloud server 102 (e.g., the NM module 110) may compute and push down a pruned 6 GHz channel list to scan for a given "RF group" of a set of wireless APs that are in close vicinity to each other (possibly connected to the same HE or a group of "neighboring" HEs) with the pruned list expected to be optimized and different for different RF groups taking into account client locations, channel planning and WIPS/WIDS cases.

In some embodiments, a cloud server (e.g., the cloud server 102) includes memory and one or more processors configured to build a set of channels for off-channel scanning to be performed by a selected group of wireless access points (APs), determine whether the set of channels for off-channel scanning can be further pruned to generate a final optimized list of channels for off-channel scanning, and send the final optimized list of channels for off-channel scanning to the selected group of wireless APs. By using the cloud server to determine channels for off-channel scanning, scan efficiency can be improved, and scan duration can be shortened. In some embodiments, the one or more processors are configured to determine whether the set of channels for off-channel scanning can be further pruned based on preferred scanning channel (PSC) information. In some embodiments, the one or more processors are configured to determine whether the set of channels for off-channel scanning can be further pruned based on historical channel utilization of the selected group of wireless APs. In some embodiments, the one or more processors are configured to determine whether the set of channels for off-channel scanning can be further pruned based on active basic service set (BSS) data gathered by the selected group of wireless APs. In some embodiments, the one or more processors are configured to cause spectral scans to be performed on the final optimized list of channels for off-channel scanning to detect non-WiFi interference. In some embodiments, the one or more processors are configured to cause deauthentication frames to be constructed and transmitted by the selected group of wireless APs on the final optimized list of channels for off-channel scanning. In some embodiments, the one or more processors are configured to cause medium access control (MAC) hardware (HW) of the selected group of wireless APs to be placed in promiscuous mode to capture different types of frames. In some embodiments, the channels for off-channel scanning are of three different frequency ranges, and the three different frequency ranges includes 2.4 gigahertz (GHz), 5 GHz, and 6 GHz.

Figure 10:
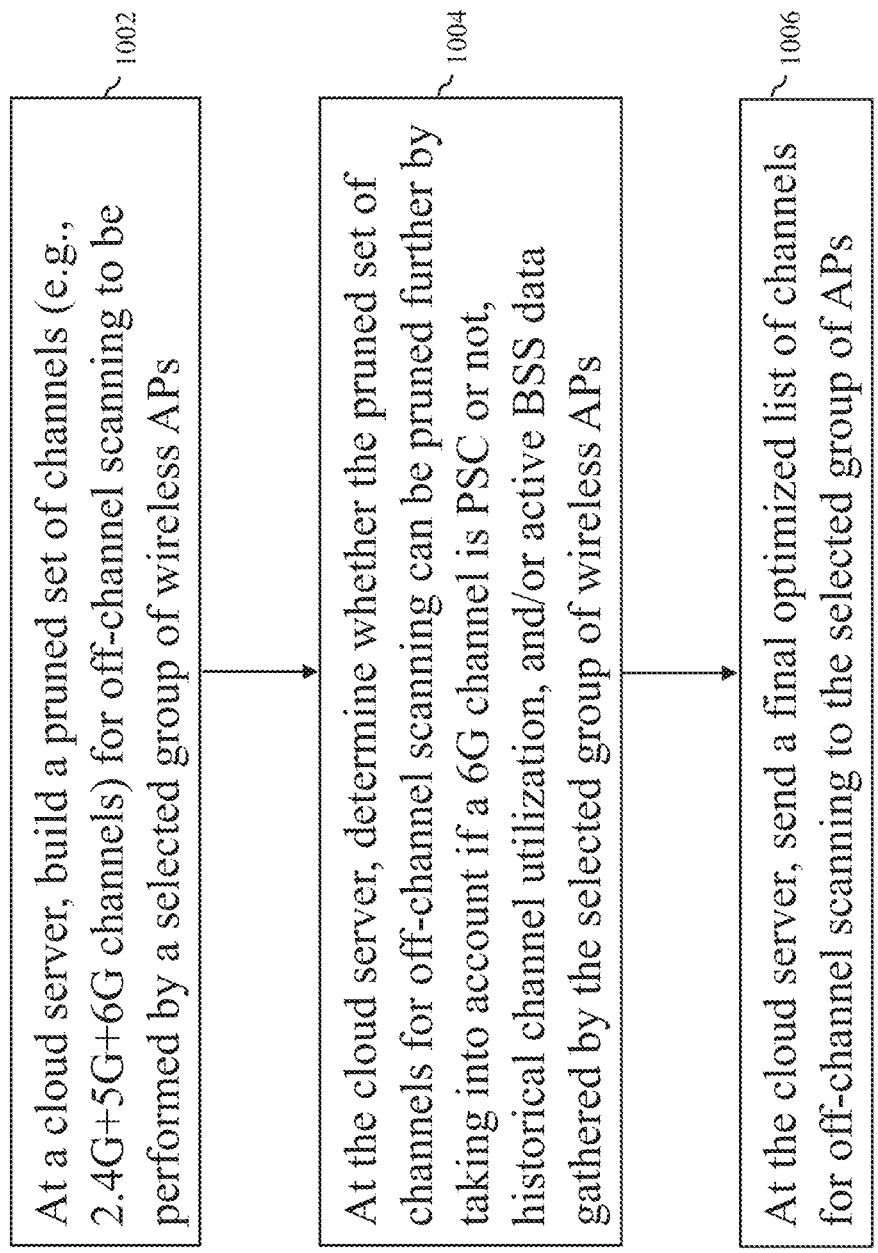
FIG. 10 is a process flow diagram of a method for a cloud centralized off-channel scanning in accordance to an embodiment of the invention.

FIG. 10 is a process flow diagram of a method for a cloud centralized off-channel scanning in accordance to an embodiment of the invention. According to the method, at block 1102, at a cloud server, a pruned set of channels (e.g., 2.4G+5G+6G channels) for off-channel scanning to be performed by a selected group of wireless APs is built. At block 1104, at the cloud server, it is determined whether the pruned set of channels for off-channel scanning can be pruned further by considering if a 6G channel is PSC or not, historical channel utilization, and/or active BSS data gathered by the selected group of wireless APs. At block 1106, at the cloud server, a final optimized list of channels for off-channel scanning is sent to the selected group of wireless APs. The cloud server may be similar to, the same as, or a component of the cloud server 102 depicted in FIG. 1. The selected group of wireless APs may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 760 depicted in FIG. 7.

A sample channel allocation for 2 AP groups by the cloud server 102 (e.g., the NM module 110) depicted in FIG. 1 is described below. AP Group 1 includes three wireless APs, AP1, AP2, AP3, operating on 6 GHz channels C1, C2, C3, while AP Group 2 includes three wireless APs, AP4, AP5, AP6, operating on 6 GHz channels C4, C5, C6.

S={Set of all 20 MHz channels in 6 GHz band}
R1={S-{C1, C2, C3}}
R2={S-{C4, C5, C6}}
Pruned list for AP Group 1={C1, C2, C3, subset of channels from R1}
Pruned list for AP Group 2={C4, C5, C6, subset of channels from R2}

Operating channels of all the APs in an AP group is expected to be present in the pruned list for that group for RSSI based client triangulation use cases. The optimality can be achieved by making sure intersection of subset of channels from R1 in pruned list 1 and subset of channels from R2 in pruned list 2 is kept as minimal as possible, by the cloud server 102 (e.g., the NM module 110) depicted in FIG. 1. Further, the subset selected for each of the AP groups can be varied over time by the cloud server 102 (e.g., the NM module 110) depicted in FIG. 1 to make sure all the 6 GHz channels in set S is scanned by each of the APs at least once within a suitable time interval.

Figure 11:
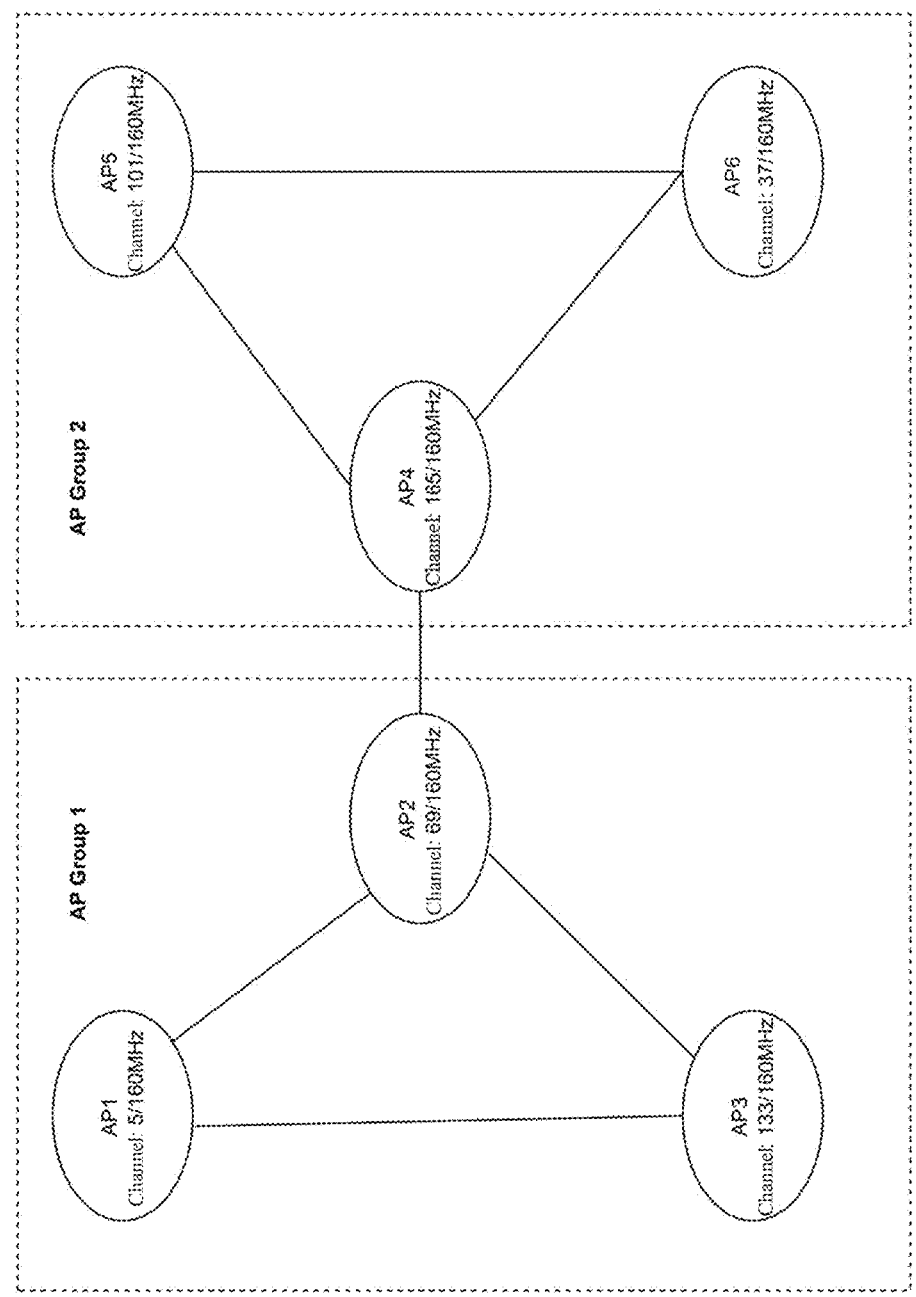
FIG. 11 depicts a sample channel allocation for AP by a cloud server depicted in FIG. 1.

FIG. 11 depicts a sample channel allocation for AP groups, AP Group 1 and AP Group 2, by the cloud server 102 (e.g., the NM module 110) depicted in FIG. 1. In the embodiment depicted in FIG. 11, AP Group 1 includes three wireless APs, AP1, AP2, AP3, operating on 6 GHz channels 5, 69, 133, while AP Group 2, includes three wireless APs, AP4, AP5, AP6, operating on 6 GHz channels 165, 101, 37.

A sample Pruned Off-channel scan list is:
Time t1
  Group 1—{All channels in 2.4G, 5G, 1-29, 65-93, 129-157, 193-233, 33-61 channels in 6G}
  Group 2—{All channels in 2.4G, 5G, 33-61, 97-125, 161-189, 1-29, 129-157 channels in 6G}
Time t2
  Group 1—{All channels in 2.4G, 5G, 1-29, 65-93, 129-157, 97-125, 161-189 channels in 6G}
  Group 2—{All channels in 2.4G, 5G, 33-61, 97-125, 161-189, 65-93, 193-233}
  {1-29, 65-93, 129-157}channel list is always present for AP Group 1 as AP1, AP2, AP3 are operating on 160 MHz channels 5, 69, and 133, respectively, and similarly, {33-61, 97-125, 161-189}channel list is always present for AP Group 2 as AP4, AP5, AP6 are operating on 160 MHz channels 165, 101, 37, respectively. A link between an AP pair <x, y> exists if x can receive a beacon from y at RSSI>a threshold (e.g., −82 dBm) and vice versa.

Figure 12:
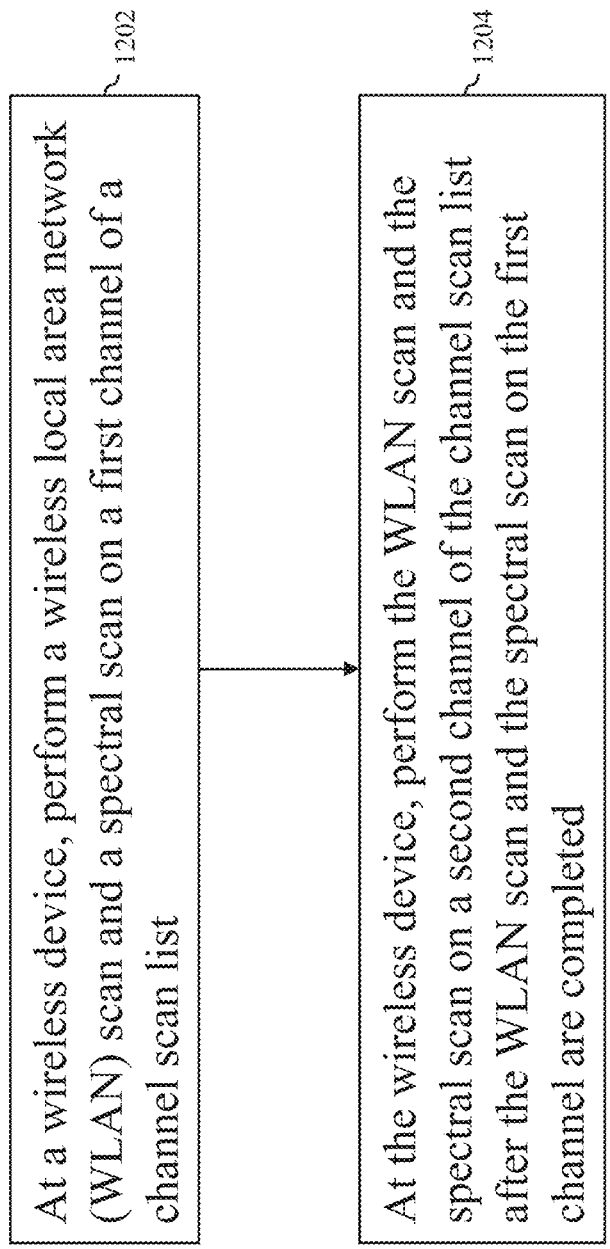
FIG. 12 is a process flow diagram of a method for wireless channel scanning in accordance to an embodiment of the invention.

FIG. 12 is a process flow diagram of a method for wireless channel scanning in accordance to an embodiment of the invention. According to the method, at block 1202, at a wireless device (e.g., a wireless AP), a wireless local area network (WLAN) scan and a spectral scan are performed on a first channel of a channel scan list. At block 1204, at the wireless device, the WLAN scan and the spectral scan are performed on a second channel of the channel scan list after the WLAN scan and the spectral scan on the first channel are completed. By performed a combined WLAN (e.g., dot11) scan and spectral scan sequentially on each channel to be scanned to detect WiFi and non-WiFi interferences, scan efficiency can be improved, and scan duration can be shortened. In some embodiments, at the wireless device, the WLAN scan is performed on the first channel of the channel scan list to detect WiFi interference, and the spectral scan is performed on the first channel of the channel scan list to detect non-WiFi interference. In some embodiments, at the wireless device, an off-channel scan is performed on the first channel of the channel scan list. In some embodiments, at the wireless device, at least one deauthentication frame is constructed and transmitted to at least one device on the first channel of the channel scan list. By performed the off-channel scan with the spectral scan sequentially on each channel to be scanned, scan efficiency can be improved, and scan duration can be shortened. In some embodiments, at the wireless device, medium access control (MAC) hardware (HW) is placed in promiscuous mode to capture different types of frames. In some embodiments, at the wireless device, the spectral scan is performed on the first channel of the channel scan list to detect non-WiFi interference after the WLAN scan on the first channel is completed. In some embodiments, the wireless device includes a wireless access point (AP). In some embodiments, a wireless network interface of the wireless AP is placed in station (STA) scanning mode in which the wireless AP behaves as a wireless station. In some embodiments, at the wireless AP, a station (STA) scan is performed on a channel of the channel scan list. In some embodiments, the wireless AP is associated with or at least one ping is transmitted to a neighboring wireless AP on a channel of the channel scan list for a service-level agreement (SLA) requirement. By performed a combined WLAN (e.g., dot11) scan and spectral scan sequentially on each channel to be scanned with STA scan, scan efficiency can be improved, and scan duration can be shortened. In some embodiments, the wireless AP further includes three wireless radio frequency (RF) frontends having three different frequency ranges. In some embodiments, the three wireless RF frontends are of 2.4 gigahertz (GHz), 5 GHz, and 6 GHz. The wireless device and/or the wireless AP may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 760 depicted in FIG. 7.

Figure 13:
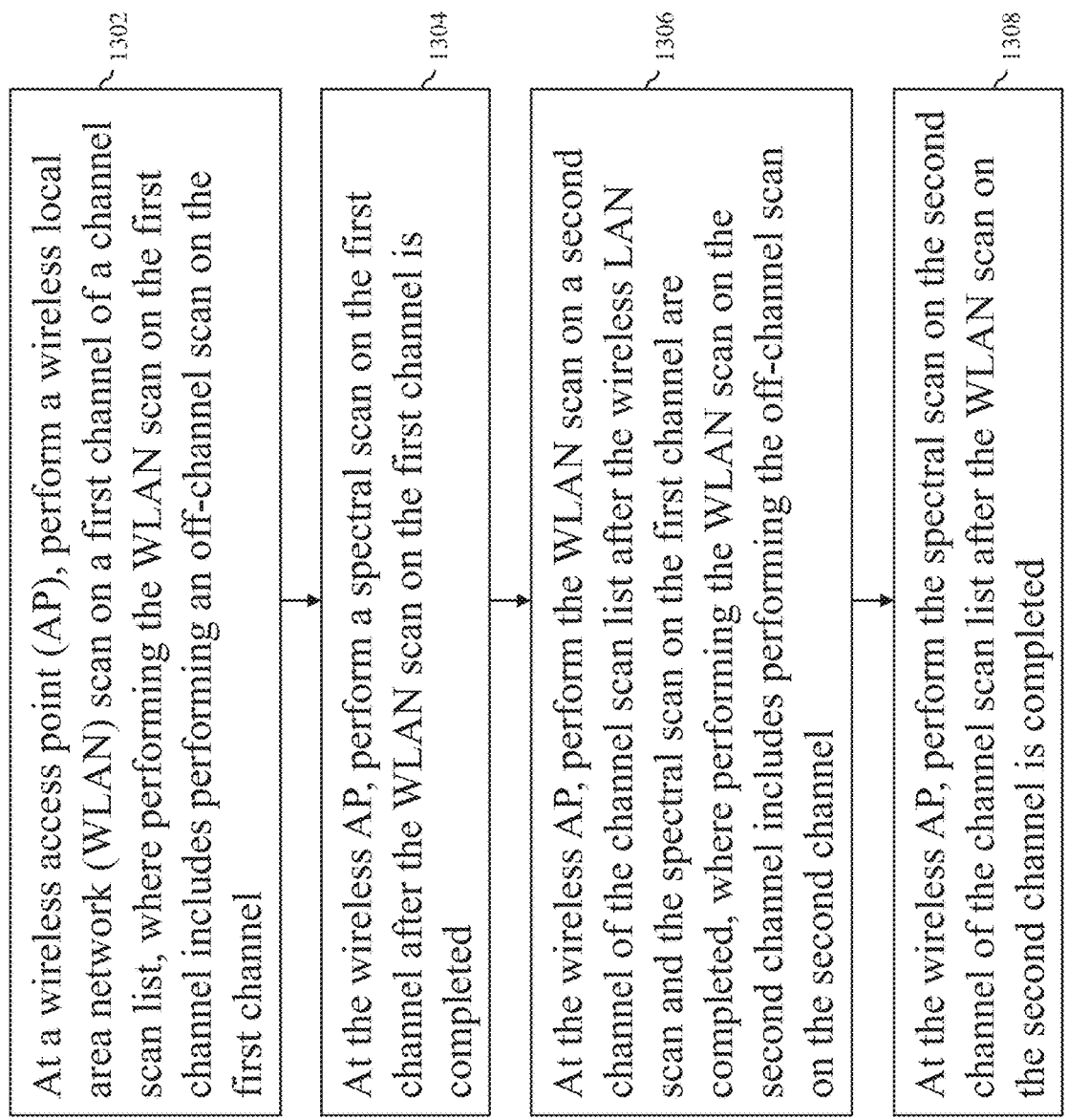
FIG. 13 is a process flow diagram of a method for wireless channel scanning in accordance to an embodiment of the invention.

FIG. 13 is a process flow diagram of a method for wireless channel scanning in accordance to an embodiment of the invention. According to the method, at block 1302, at a wireless access point (AP), a wireless local area network (WLAN) scan is performed on a first channel of a channel scan list, where performing the WLAN scan on the first channel includes performing an off-channel scan on the first channel. At block 1304, at the wireless AP, a spectral scan is performed on the first channel after the WLAN scan on the first channel is completed. At block 1306, at the wireless AP, the WLAN scan is performed on a second channel of the channel scan list after the WLAN scan and the spectral scan on the first channel are completed, where performing the WLAN scan on the second channel includes performing the off-channel scan on the second channel. At block 1308, at the wireless AP, the spectral scan is performed on the second channel of the channel scan list after the WLAN scan on the second channel is completed. By performing the off-channel scan with the spectral scan sequentially on each channel to be scanned, scan efficiency can be improved, and scan duration can be shortened. The wireless AP may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 760 depicted in FIG. 7.

Figure 14:
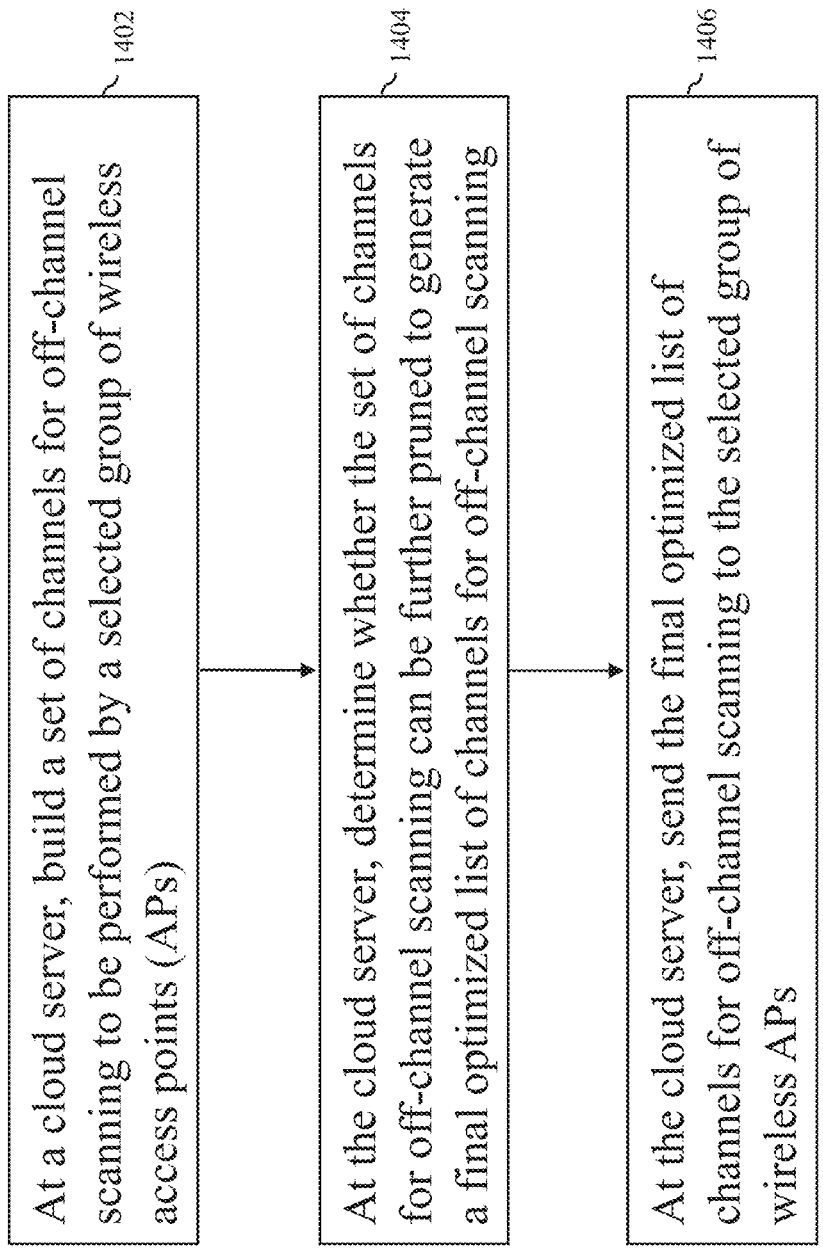
FIG. 14 is a process flow diagram of a method for wireless channel scanning in accordance to an embodiment of the invention.

FIG. 14 is a process flow diagram of a method for wireless channel scanning in accordance to an embodiment of the invention. According to the method, at block 1402, at a cloud server, a set of channels for off-channel scanning to be performed by a selected group of wireless access points (APs) is built or generated. At block 1404, at the cloud server, it is determined whether the set of channels for off-channel scanning can be further pruned to generate a final optimized list of channels for off-channel scanning. At block 1406, at the cloud server, the final optimized list of channels for off-channel scanning is sent to the selected group of wireless APs. By using the cloud server to determine channels for off-channel scanning, scan efficiency can be improved, and scan duration can be shortened. In some embodiments, at the cloud server, it is determined whether the set of channels for off-channel scanning can be further pruned based on preferred scanning channel (PSC) information. In some embodiments, at the cloud server, it is determined whether the set of channels for off-channel scanning can be further pruned based on historical channel utilization of the selected group of wireless APs. In some embodiments, at the cloud server, it is determined whether the set of channels for off-channel scanning can be further pruned based on active basic service set (BSS) data gathered by the selected group of wireless APs. In some embodiments, at the cloud server, spectral scans are caused to be performed on the final optimized list of channels for off-channel scanning to detect non-WiFi interference. In some embodiments, at the cloud server, deauthentication frames are caused to be constructed and transmitted by the selected group of wireless APs on the final optimized list of channels for off-channel scanning. In some embodiments, at the cloud server, medium access control (MAC) hardware (HW) of the selected group of wireless APs is caused to be placed in promiscuous mode to capture different types of frames. In some embodiments, the channels for off-channel scanning are of three different frequency ranges. In some embodiments, the three different frequency ranges comprise 2.4 gigahertz (GHz), 5 GHz, and 6 GHz. In some embodiments, each wireless AP of the selected group of wireless APs further comprises three wireless radio frequency (RF) frontends having three different frequency ranges. In some embodiments, the three wireless RF frontends are of 2.4 gigahertz (GHz), 5 GHz, and 6 GHz. The cloud server may be similar to, the same as, or a component of the cloud server 102 depicted in FIG. 1. The selected group of wireless APs may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 760 depicted in FIG. 7.

Figure 15:
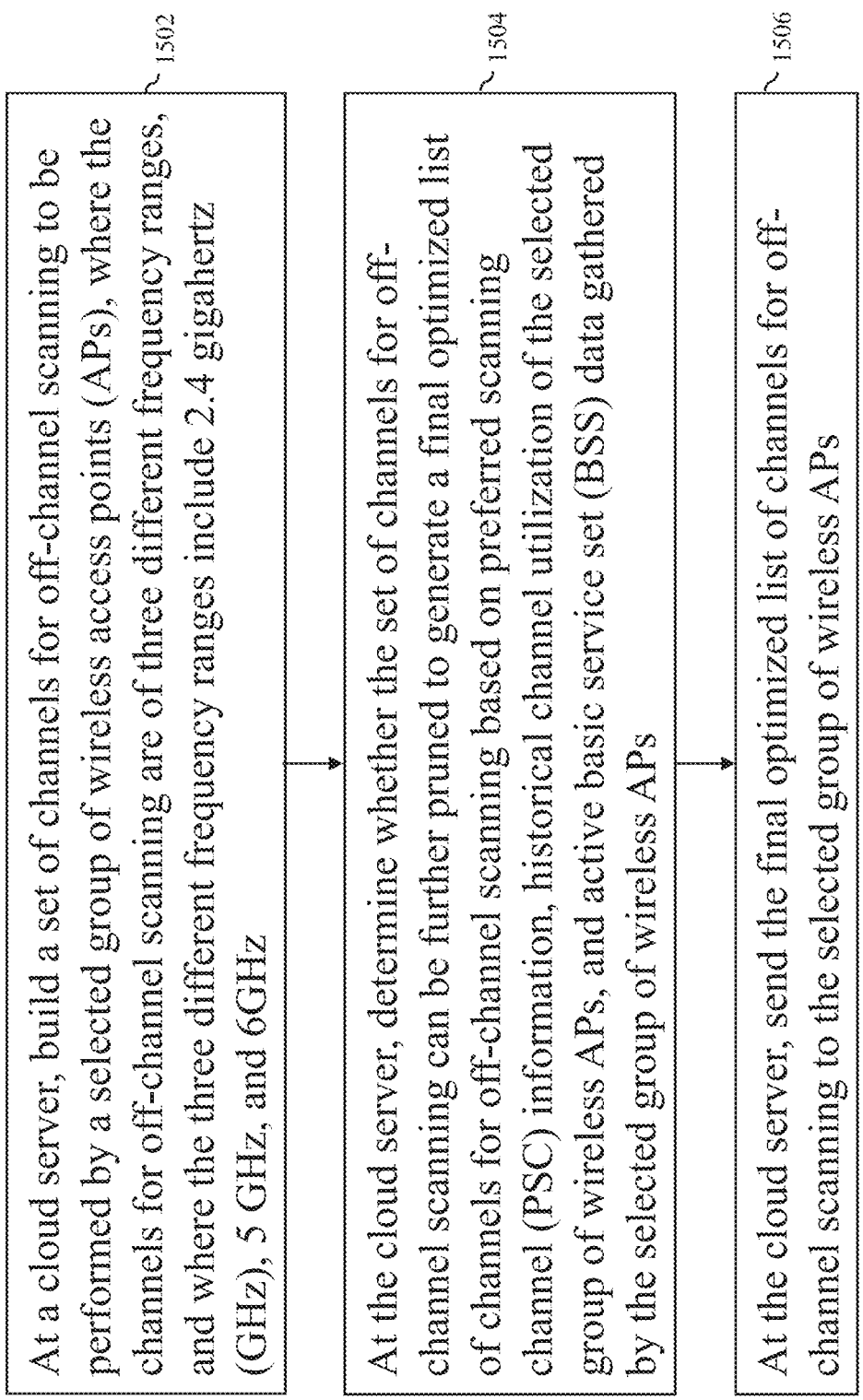
FIG. 15 is a process flow diagram of a method for wireless channel scanning in accordance to an embodiment of the invention.

FIG. 15 is a process flow diagram of a method for wireless channel scanning in accordance to an embodiment of the invention. According to the method, at block 1502, at a cloud server, a set of channels for off-channel scanning to be performed by a selected group of wireless access points (APs) is built or generated, where the channels for off-channel scanning are of three different frequency ranges, and where the three different frequency ranges comprise 2.4 gigahertz (GHz), 5 GHz, and 6 GHz. At block 1504, at the cloud server, it is determined whether the set of channels for off-channel scanning can be further pruned to generate a final optimized list of channels for off-channel scanning based on preferred scanning channel (PSC) information, historical channel utilization of the selected group of wireless APs, and active basic service set (BSS) data gathered by the selected group of wireless APs. At block 1506, at the cloud server, the final optimized list of channels for off-channel scanning is sent to the selected group of wireless APs. By using the cloud server to determine channels for off-channel scanning, scan efficiency can be improved, and scan duration can be shortened. The cloud server may be similar to, the same as, or a component of the cloud server 102 depicted in FIG. 1. The selected group of wireless APs may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 760 depicted in FIG. 7.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless channel scanning, the method comprising:
   at a cloud server, building a set of channels for off-channel scanning to be performed by a selected group of wireless access points (APs);
   at the cloud server, determining whether the set of channels for off-channel scanning can be further pruned to generate a final optimized list of channels for off-channel scanning by considering whether or not a 6 gigahertz (GHz) channel is a preferred scanning channel (PSC), historical channel utilization, and active basic service set (BSS) data gathered by the selected group of wireless APs;
   at the cloud server, sending the final optimized list of channels for off-channel scanning to the selected group of wireless APs; and
   at the cloud server, causing a plurality of deauthentication frames to be constructed and transmitted by the selected group of wireless APs on the final optimized list of channels for off-channel scanning and for rogue AP handling.

2. The method of claim 1, further comprises at the cloud server, causing a plurality of spectral scans to be performed on the final optimized list of channels for off-channel scanning to detect non-WiFi interference.

3. The method of claim 1, further comprises at the cloud server, causing medium access control (MAC) hardware (HW) of the selected group of wireless APs to be placed in promiscuous mode to capture different types of frames.

4. The method of claim 1, wherein the channels for off-channel scanning are of three different frequency ranges.

5. The method of claim 4, wherein the three different frequency ranges comprise 2.4 GHz, 5 GHz, and 6 GHz.

6. The method of claim 1, wherein each wireless AP of the selected group of wireless APs further comprises three wireless radio frequency (RF) frontends having three different frequency ranges.

7. The method of claim 6, wherein the three wireless RF frontends are of 2.4 GHz, 5 GHz, and 6 GHz.

8. A cloud server, the cloud server comprising:
   memory; and
   one or more processors configured to:
      build a set of channels for off-channel scanning to be performed by a selected group of wireless access points (APs);
      determine whether the set of channels for off-channel scanning can be further pruned to generate a final optimized list of channels for off-channel scanning by considering whether or not a 6 gigahertz (GHz) channel is a preferred scanning channel (PSC), historical channel utilization, and active basic service set (BSS) data gathered by the selected group of wireless APs;
      send the final optimized list of channels for off-channel scanning to the selected group of wireless APs; and
      cause a plurality of deauthentication frames to be constructed and transmitted by the selected group of wireless APs on the final optimized list of channels for off-channel scanning and for rogue AP handling.

9. The cloud server of claim 8, wherein the one or more processors are configured to cause a plurality of spectral scans to be performed on the final optimized list of channels for off-channel scanning to detect non-WiFi interference.

10. The cloud server of claim 8, wherein the one or more processors are configured to cause medium access control (MAC) hardware (HW) of the selected group of wireless APs to be placed in promiscuous mode to capture different types of frames.

11. The cloud server of claim 8, wherein the channels for off-channel scanning are of three different frequency ranges, and wherein the three different frequency ranges comprise 2 GHz; 5 GHz, and 6 GHz.

12. A method for wireless channel scanning, the method comprising:
   at a cloud server, building a set of channels for off-channel scanning to be performed by a selected group of wireless access points (APs), wherein the channels for off-channel scanning are of three different frequency ranges, and wherein the three different frequency ranges comprise 2.4 gigahertz (GHz), 5 GHz, and 6 GHz;
   at the cloud server, determining whether the set of channels for off-channel scanning can be further pruned to generate a final optimized list of channels for off-channel scanning by considering whether or not a 6 GHz channel is a preferred scanning channel (PSC), historical channel utilization, and active basic service set (BSS) data gathered by the selected group of wireless APs;
   at the cloud server, sending the final optimized list of channels for off-channel scanning to the selected group of wireless APs; and
   at the cloud server, causing a plurality of deauthentication frames to be constructed and transmitted by the selected group of wireless APs on the final optimized list of channels for off-channel scanning and for rogue AP handling.

* * * * *